United States Patent [19]

Baji

[11] Patent Number: 5,740,404
[45] Date of Patent: Apr. 14, 1998

[54] DIGITAL SIGNAL PROCESSOR WITH ON-CHIP SELECT DECODER AND WAIT STATE GENERATOR

[75] Inventor: Toru Baji, San Jose, Calif.

[73] Assignee: Hitachi America Limited, Tarrytown, N.Y.

[21] Appl. No.: 127,682

[22] Filed: Sep. 27, 1993

[51] Int. Cl.⁶ .................... G06F 12/00; G06F 13/00; G06F 1/04
[52] U.S. Cl. .................. 395/494; 395/497.01; 395/405; 395/651; 395/552; 395/558; 395/556; 395/836; 395/879
[58] Field of Search .................. 395/494, 427, 395/550, 650, 845, 879, 497.01, 497.02, 497.03, 497.04, 442, 551, 552, 556, 557, 558, 555, 651, 652, 653, 405, 830, 833, 836

[56] References Cited

U.S. PATENT DOCUMENTS

| | | | |
|---|---|---|---|
| 4,245,305 | 1/1981 | Gechele et al. | 395/845 |
| 4,498,135 | 2/1985 | Caudel | 395/800 |
| 4,502,117 | 2/1985 | Kihara | 395/848 |
| 4,503,500 | 3/1985 | Magar | 395/800 |
| 4,520,458 | 5/1985 | Hattori et al. | 395/494 |
| 4,535,404 | 8/1985 | Shenk | 395/879 |
| 4,631,659 | 12/1986 | Hayn, II et al. | 395/494 |
| 4,636,656 | 1/1987 | Snowden et al. | 327/174 |
| 4,692,895 | 9/1987 | Huffman | 395/879 |
| 4,819,164 | 4/1989 | Branson | 395/556 |
| 4,853,847 | 8/1989 | Ohuchi | 395/559 |
| 4,935,867 | 6/1990 | Wang et al. | 395/421.07 |
| 4,958,276 | 9/1990 | Kiuchi et al. | 395/494 |
| 4,992,960 | 2/1991 | Yamaoka et al. | 395/164 |
| 5,057,996 | 10/1991 | Cutler et al. | 395/676 |
| 5,070,473 | 12/1991 | Takano et al. | 395/733 |
| 5,151,986 | 9/1992 | Langan et al. | 395/281 |
| 5,155,812 | 1/1993 | Baji | 395/879 |
| 5,253,355 | 10/1993 | Grieff | 395/494 |
| 5,313,621 | 5/1994 | Chan | 395/868 |
| 5,325,521 | 6/1994 | Koyama et al. | 395/185.08 |
| 5,448,744 | 9/1995 | Eifert et al. | 395/800 |
| 5,463,756 | 10/1995 | Saito et al. | 395/494 |

Primary Examiner—Glenn Gossage
Attorney, Agent, or Firm—Flehr Hohbach Test Albritton & Herbert LLP

[57] ABSTRACT

A digital signal processor (DSP) provides an improvement in the interfacing and sharing of external memory devices. Specifically, the digital signal processor is provided with a parallel interface for communicating with external memory devices, a chip select decoder located on-chip for selectably enabling external memory devices, and a wait status controller for holding processor operation until the selected memory device is ready. The memory architecture is configurable for internal or external wait state generation and memory sharing with other DSPs so that a plurality of varying speed memory devices may be accessed. The chip select decoder includes a programmable register for storing a mode configuration word for defining a plurality of external memory configurations.

9 Claims, 22 Drawing Sheets

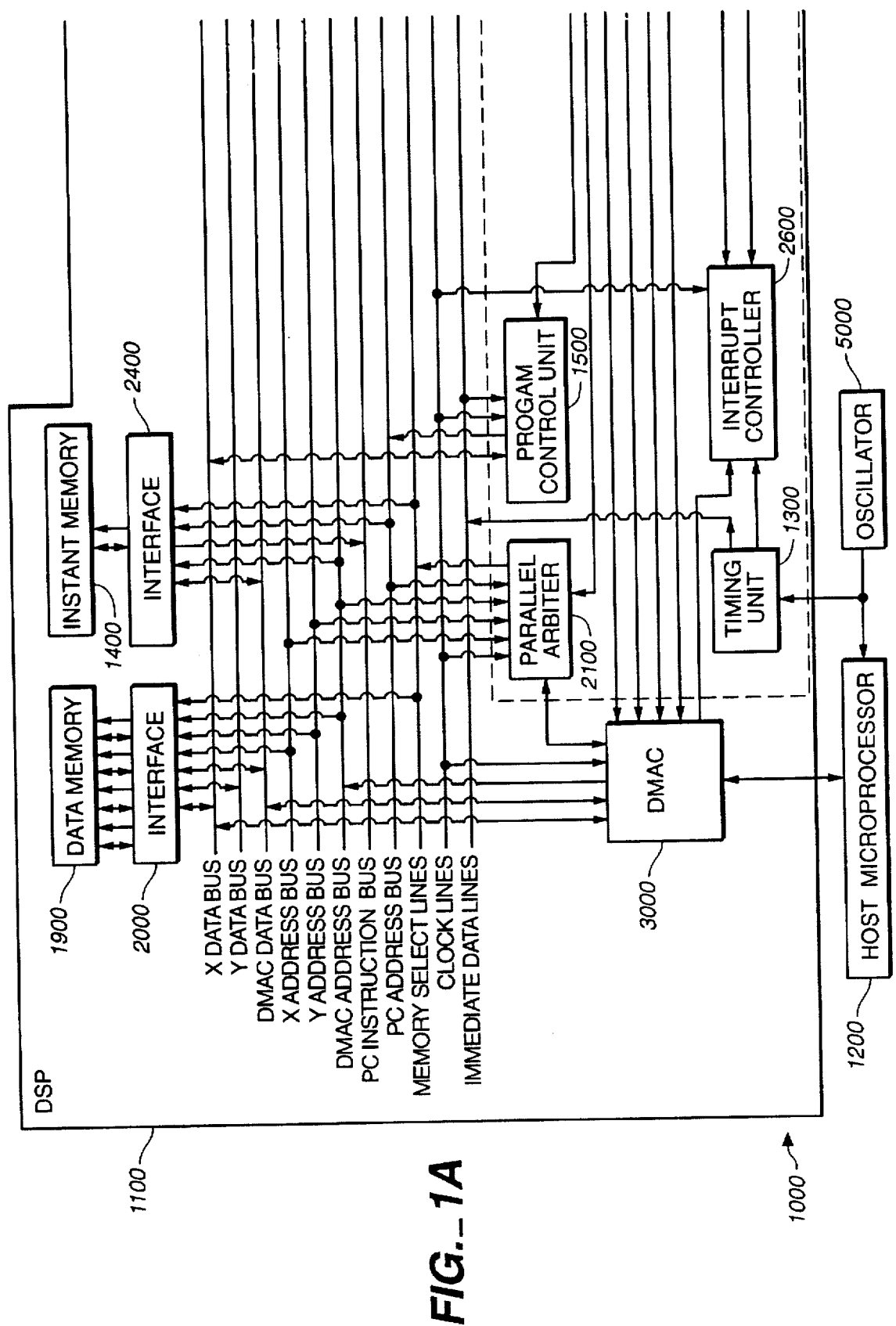
FIG._1A

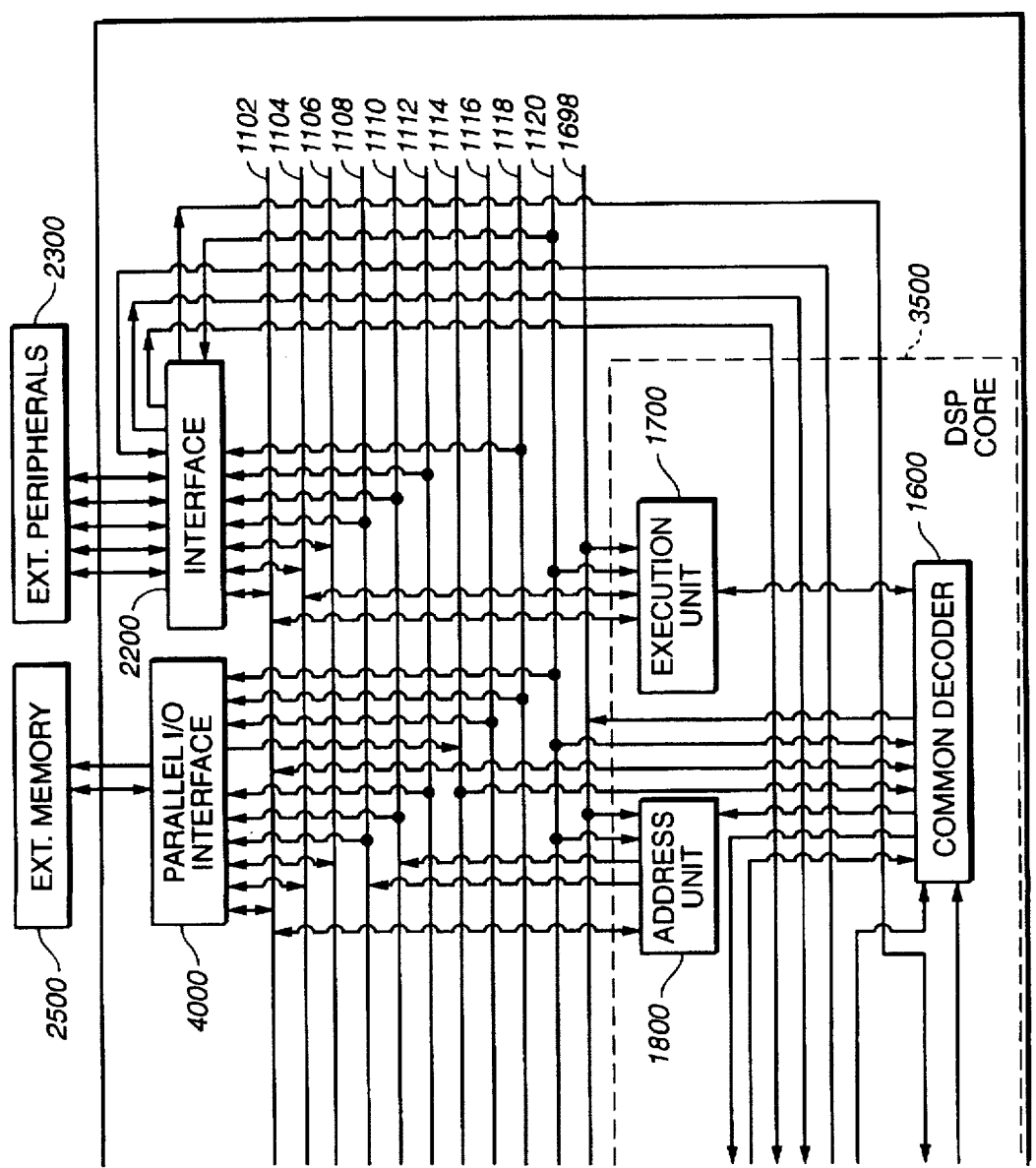

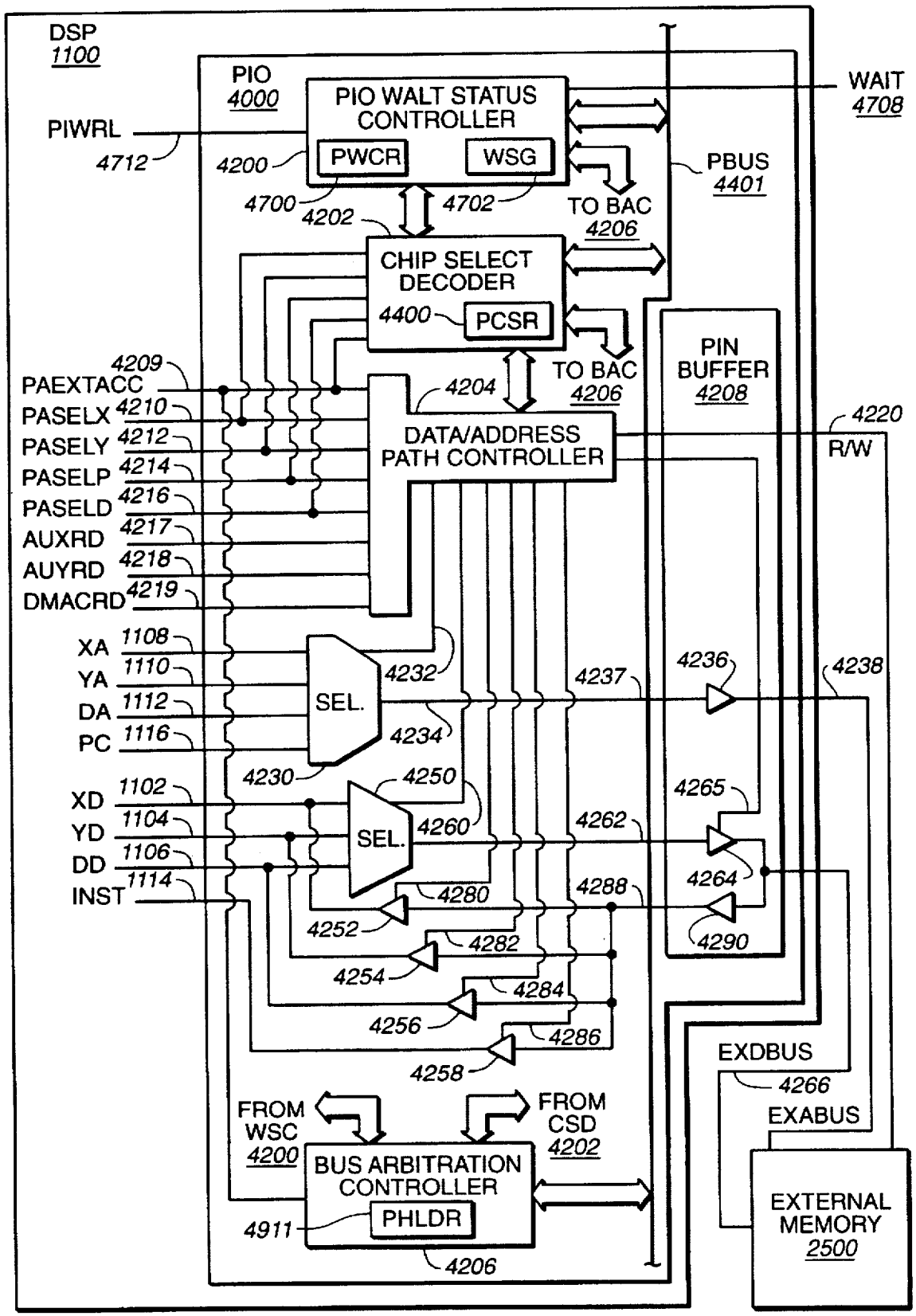
FIG._2

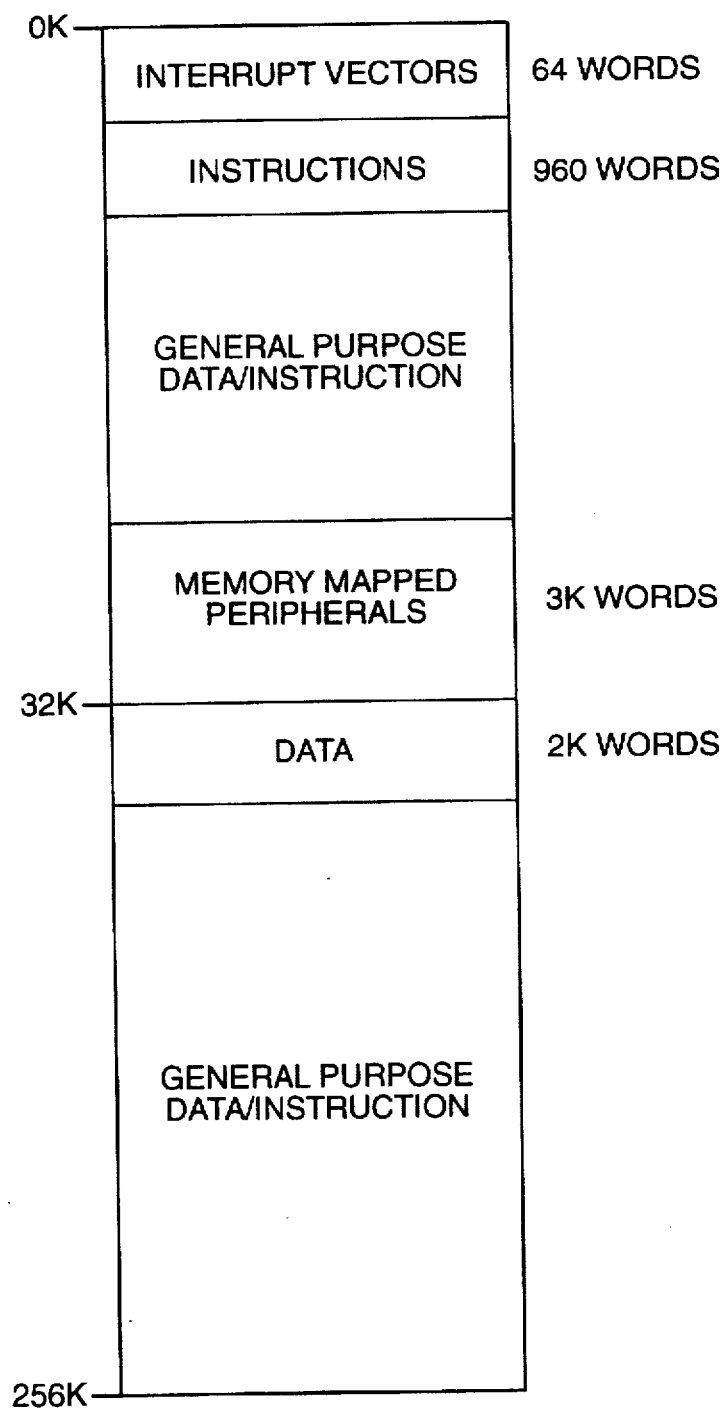
FIG._3A

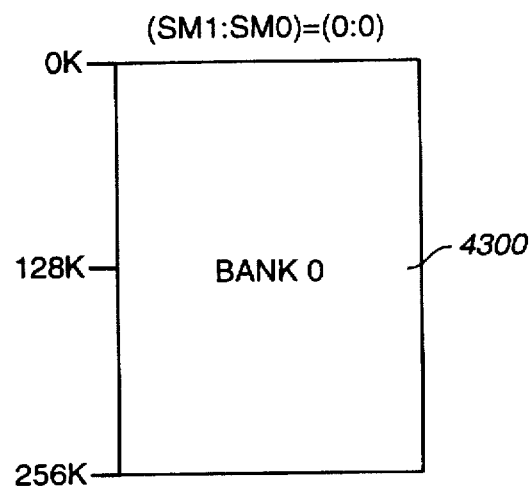
FIG._3B
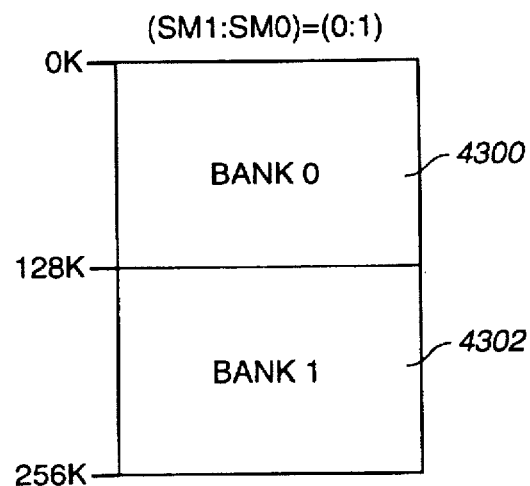
FIG._3C
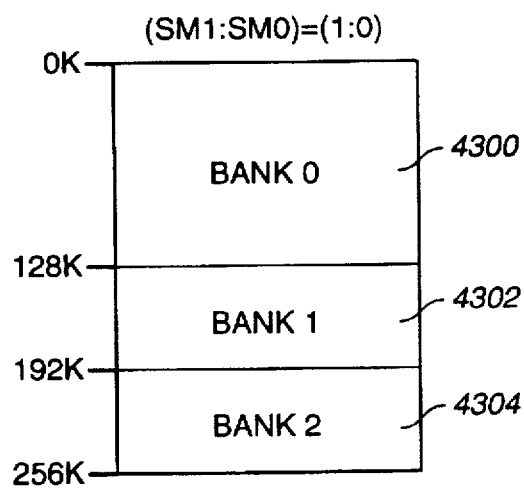
FIG._3D
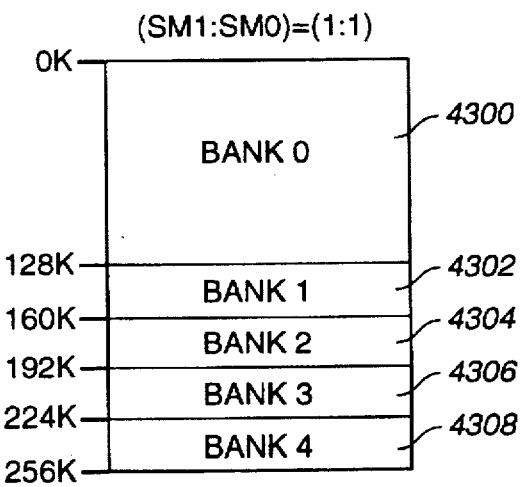
FIG._3E

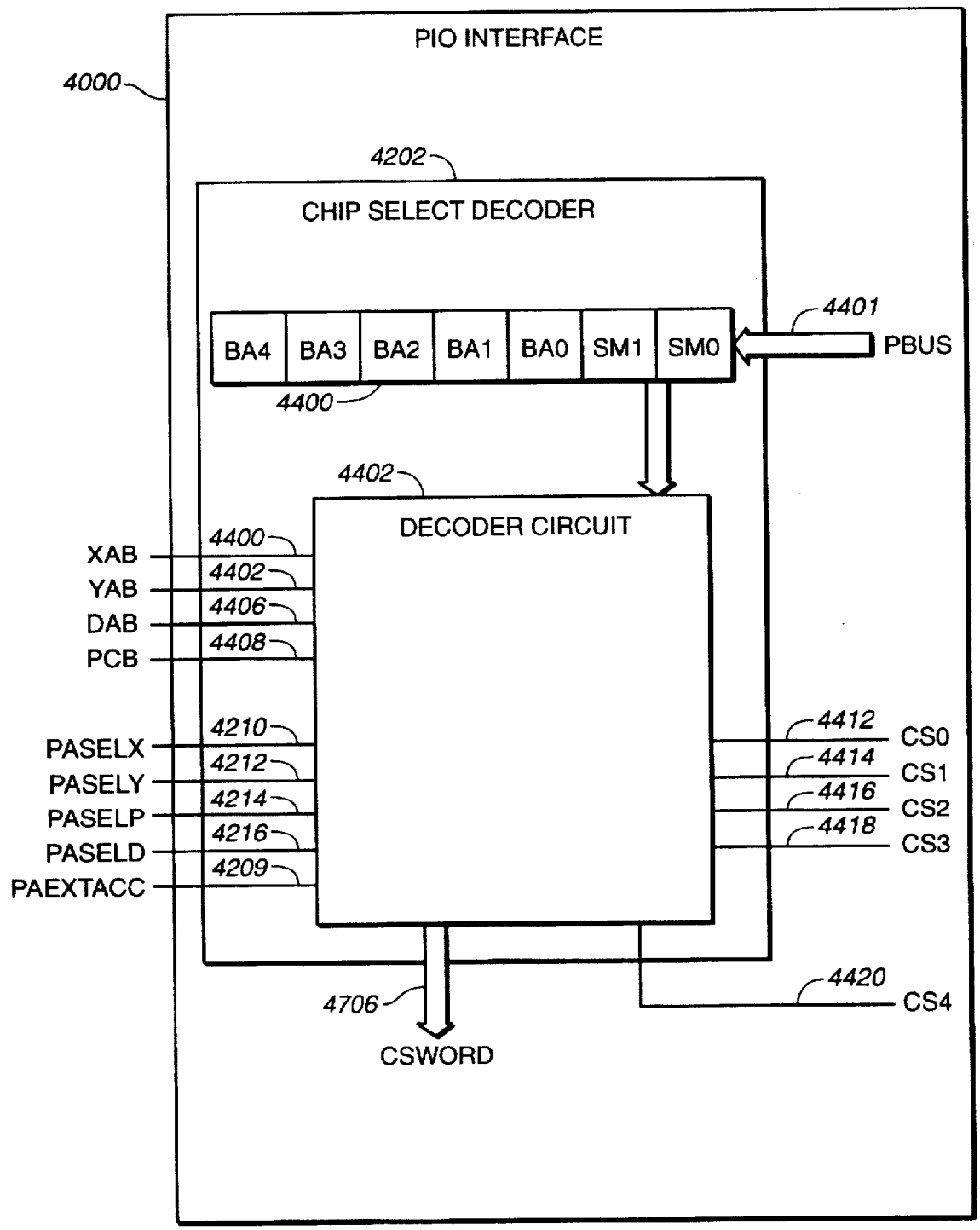
FIG._4

| (SM1,SM0) | (0,0) | | | | | (0,1) | | | | | (1,0) | | | | | (1,1) | | | | |
|---|---|---|---|---|---|---|---|---|---|---|---|---|---|---|---|---|---|---|---|---|
| (A17,A16,A15) | CS0 | CS1 | CS2 | CS3 | CS4 | CS0 | CS1 | CS2 | CS3 | CS4 | CS0 | CS1 | CS2 | CS3 | CS4 | CS0 | CS1 | CS2 | CS3 | CS4 |
| (0,0,0) | 0 | | | | | 0 | | | | | 0 | | | | | 0 | | | | |
| (0,0,1) | 0 | | | | | 0 | | | | | 0 | | | | | 0 | | | | |
| (0,1,0) | 0 | | | | | 0 | | | | | 0 | | | | | 0 | | | | |
| (0,1,1) | 0 | | | | | 0 | | | | | 0 | | | | | 0 | | | | |
| (1,0,0) | 0 | | | | | | 0 | | | | | 0 | | | | | 0 | | | |
| (1,0,1) | 0 | | | | | | 0 | | | | | 0 | | | | | | 0 | | |
| (1,1,0) | 0 | | | | | | 0 | | | | | | 0 | | | | | | 0 | |
| (1,1,1) | 0 | | | | | | 0 | | | | | 0 | | | | | | | | 0 |

*FIG._5*

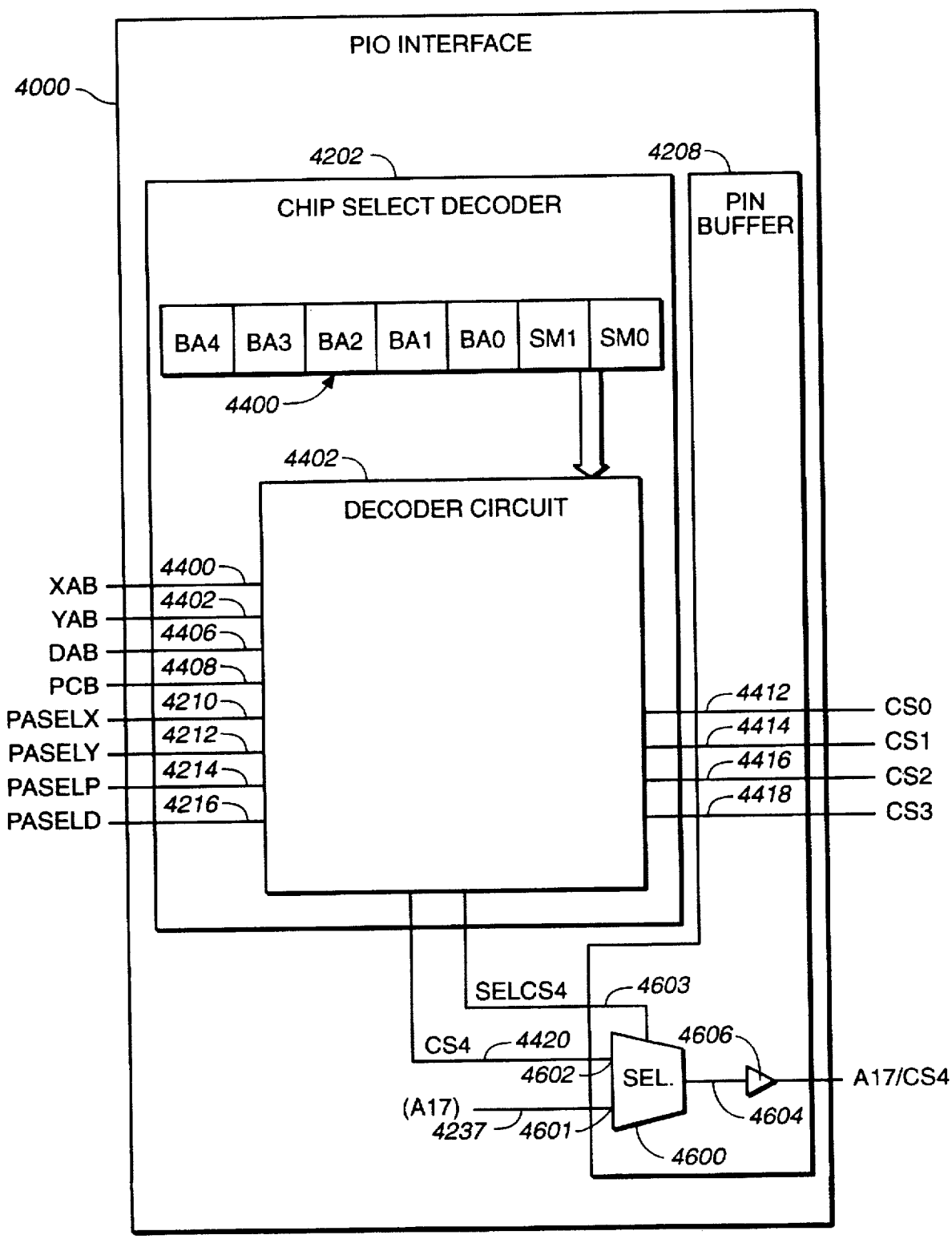
FIG._6

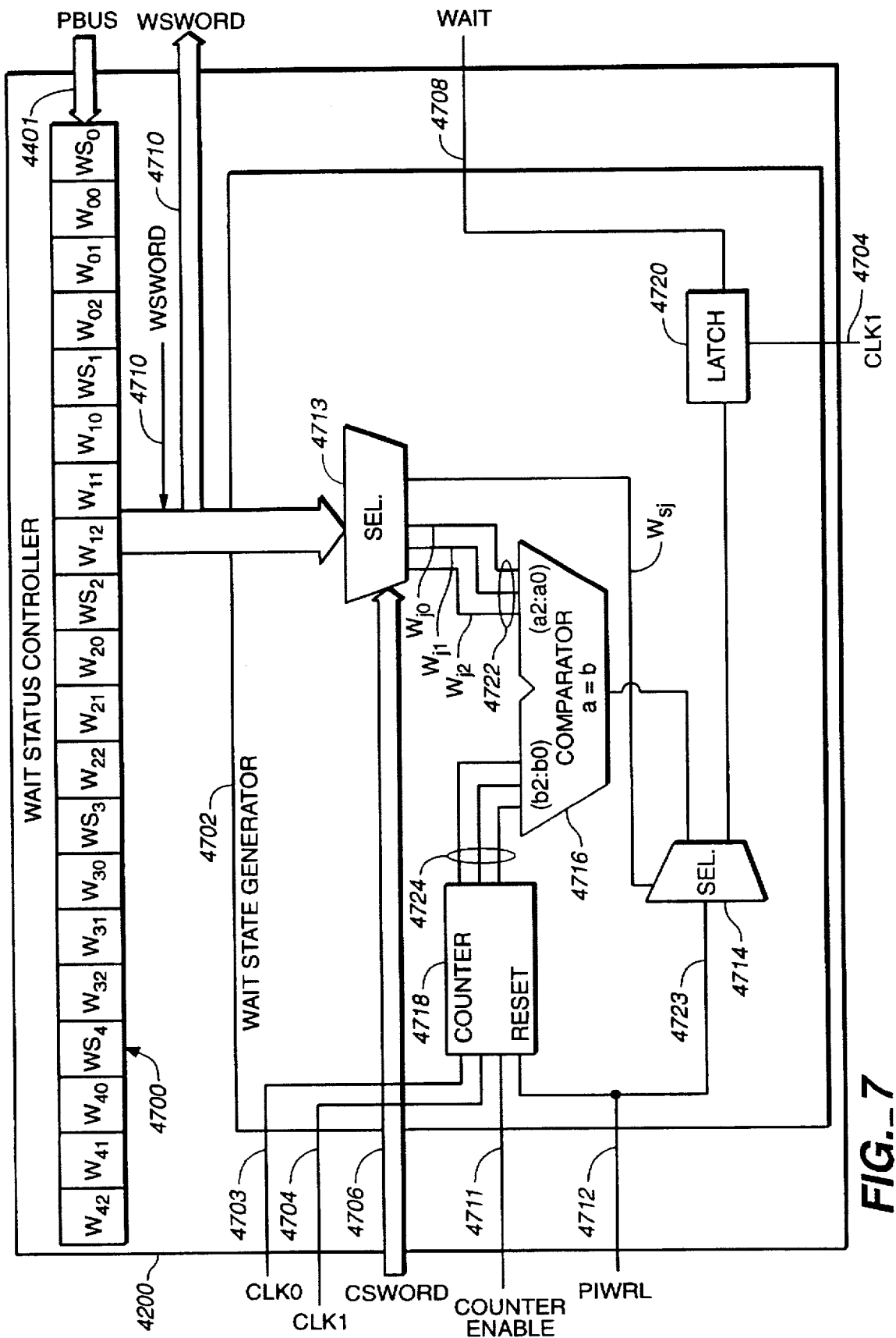
FIG._7

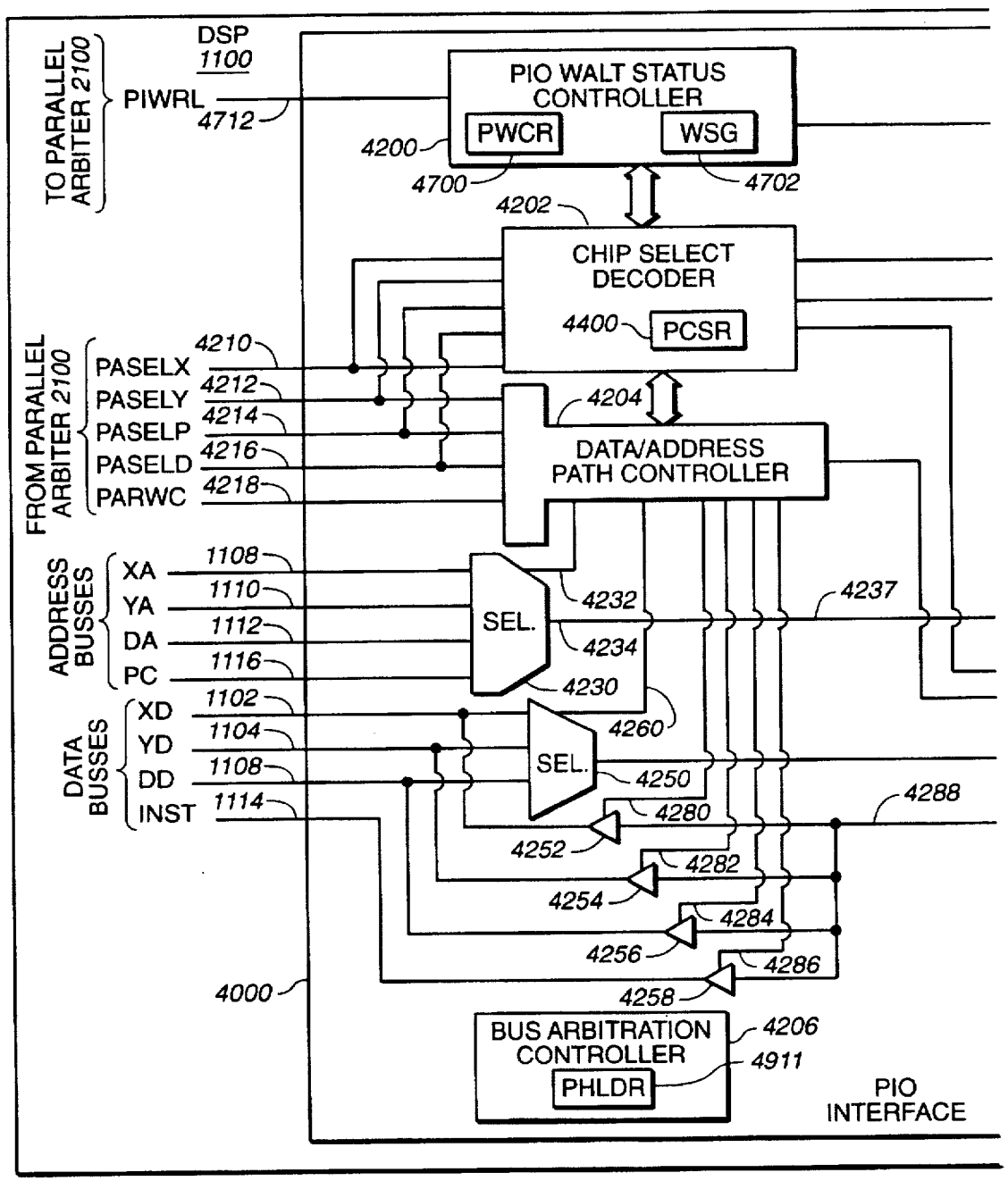
FIG._8A
FIG._8 | FIG._8A | FIG._8B

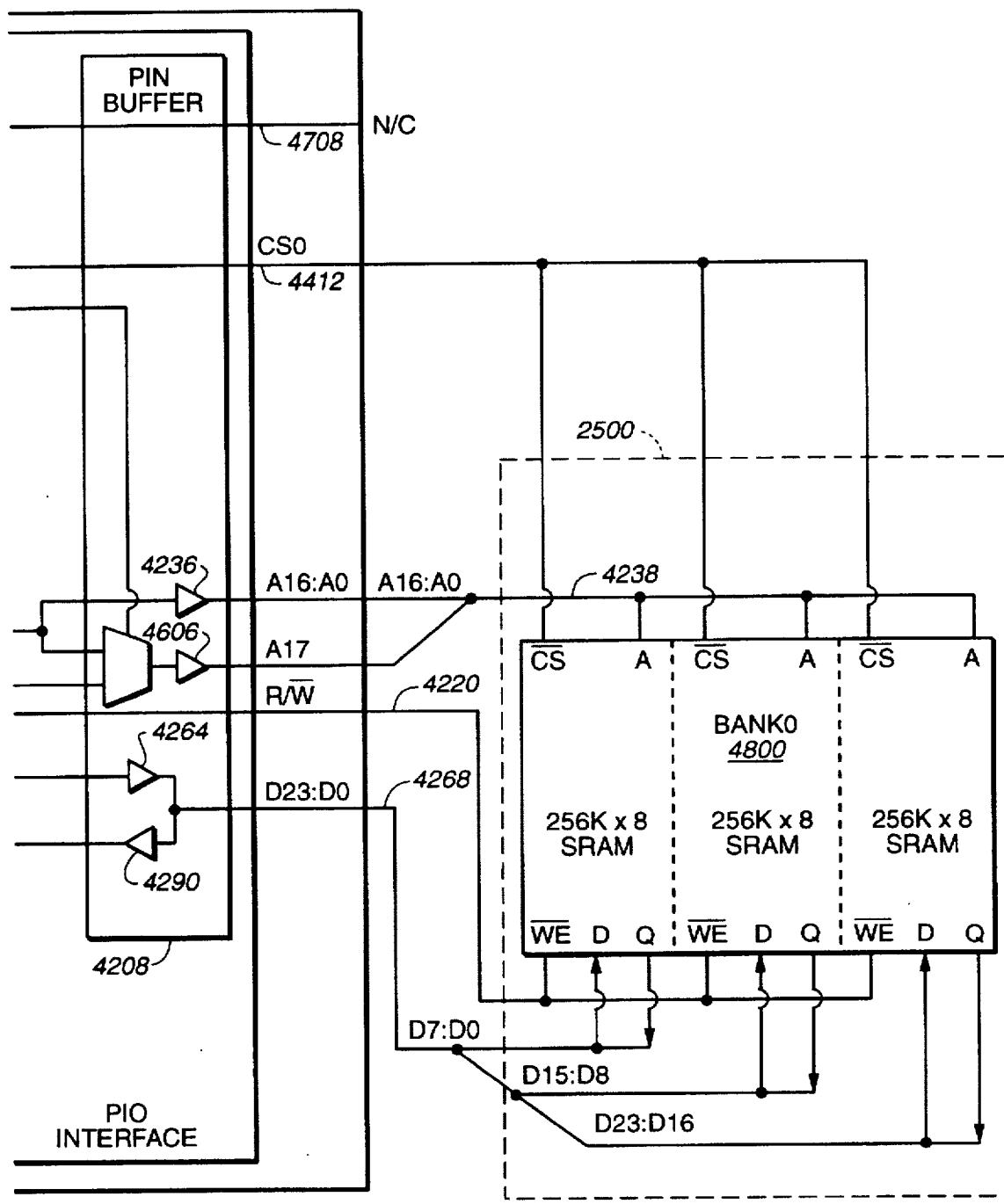
FIG._8B

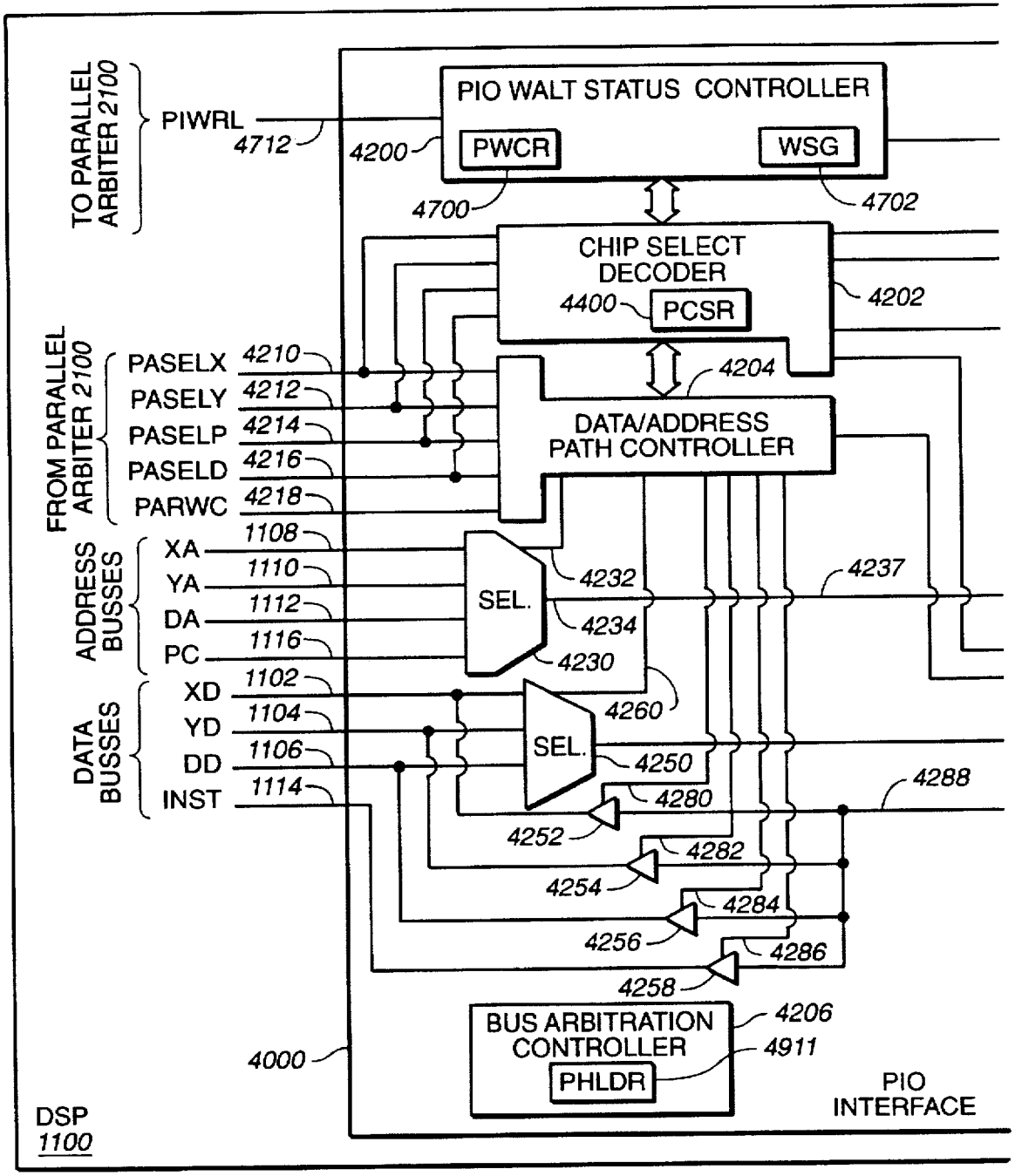
FIG._9A
FIG._9 | FIG._9A | FIG._9B | FIG._9C

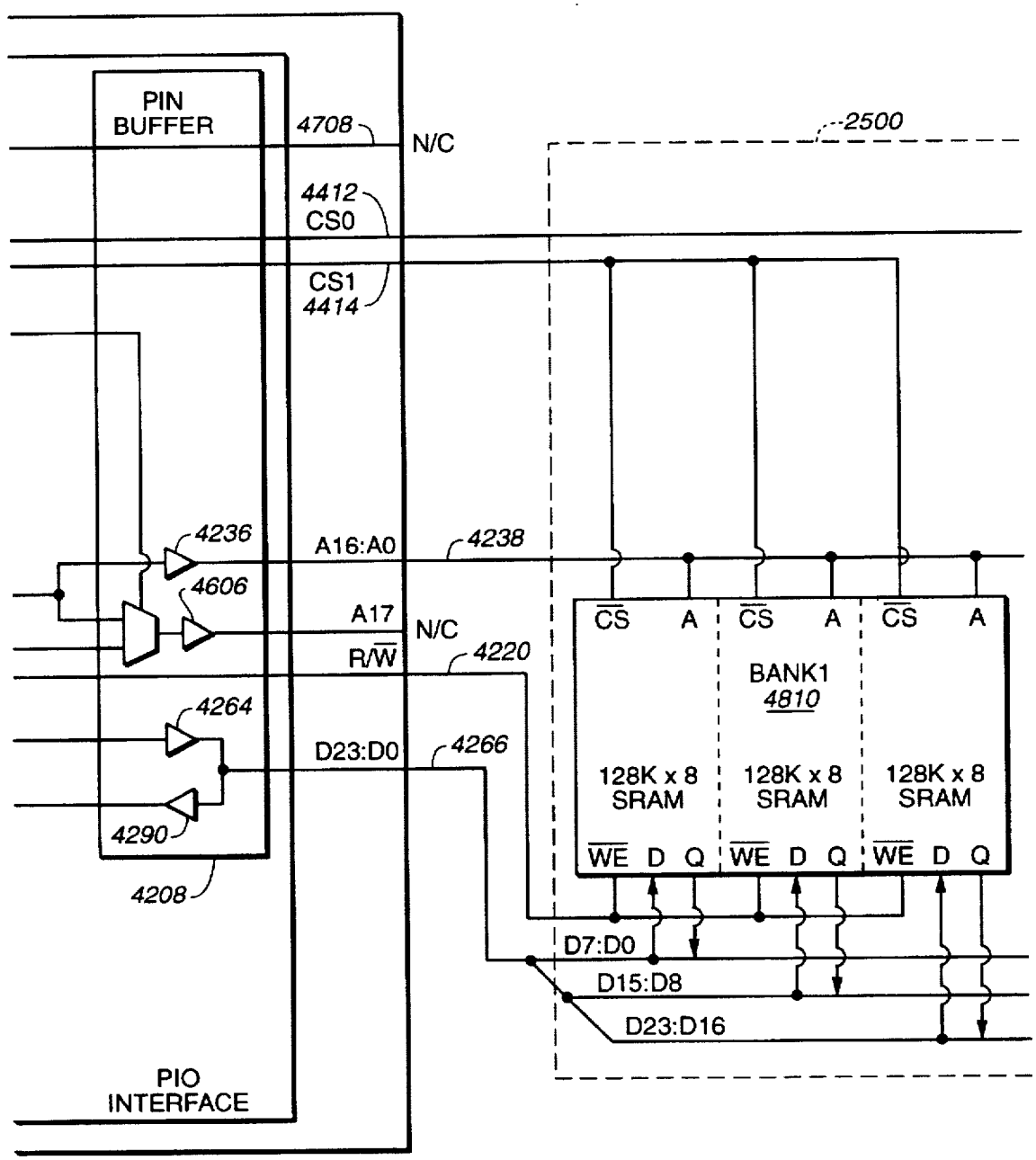
FIG._9B

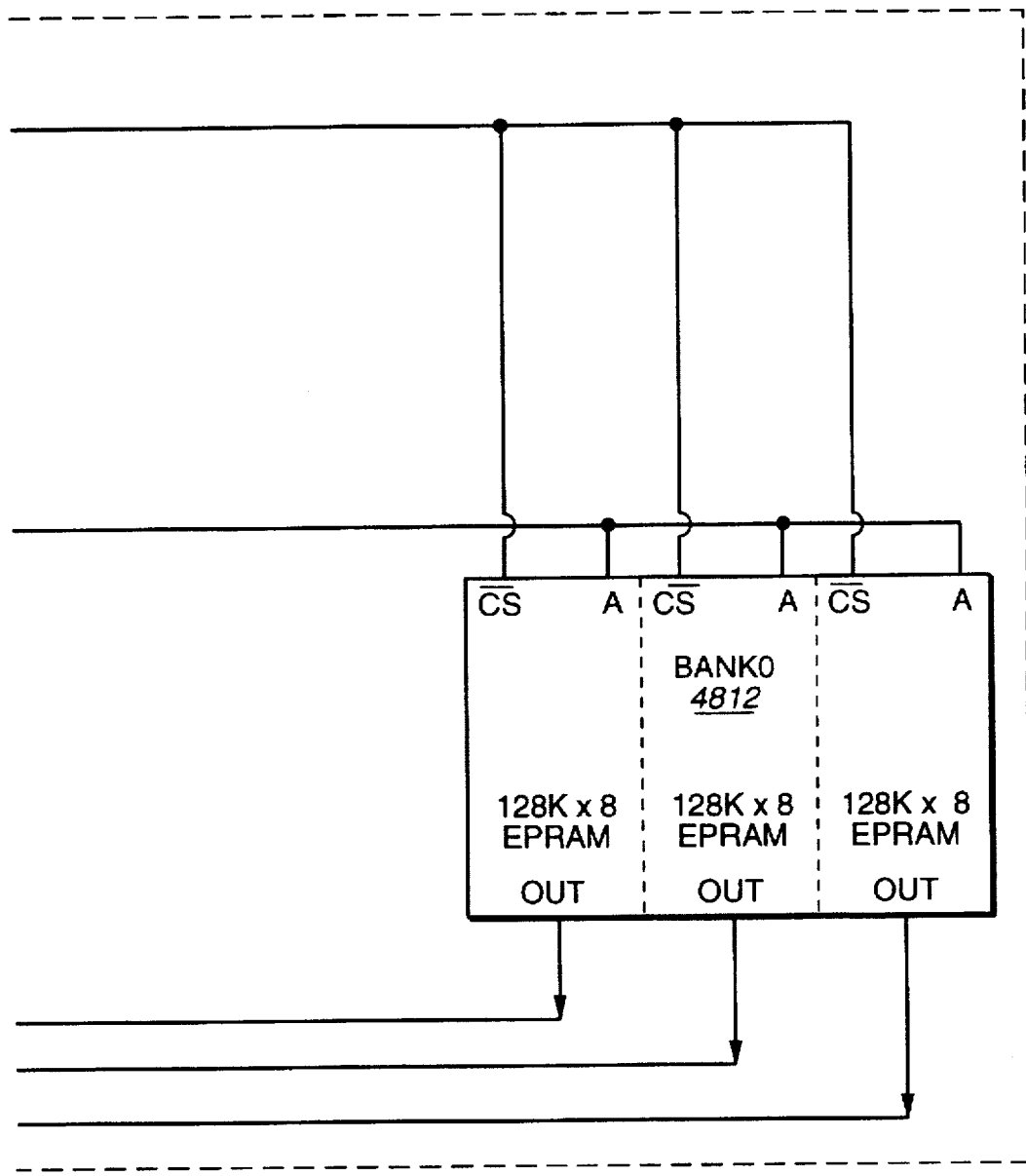
FIG._9C

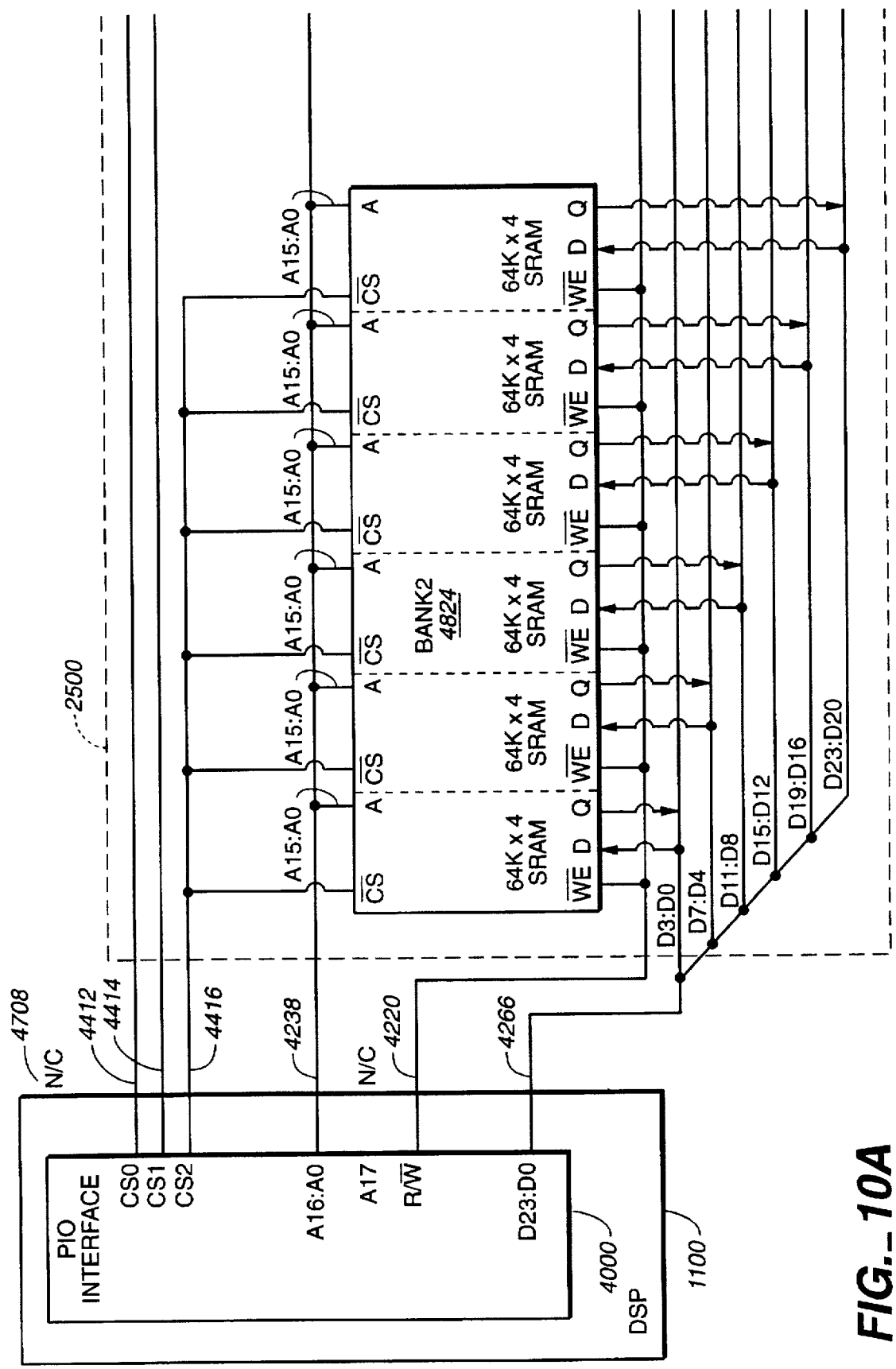
FIG._10A

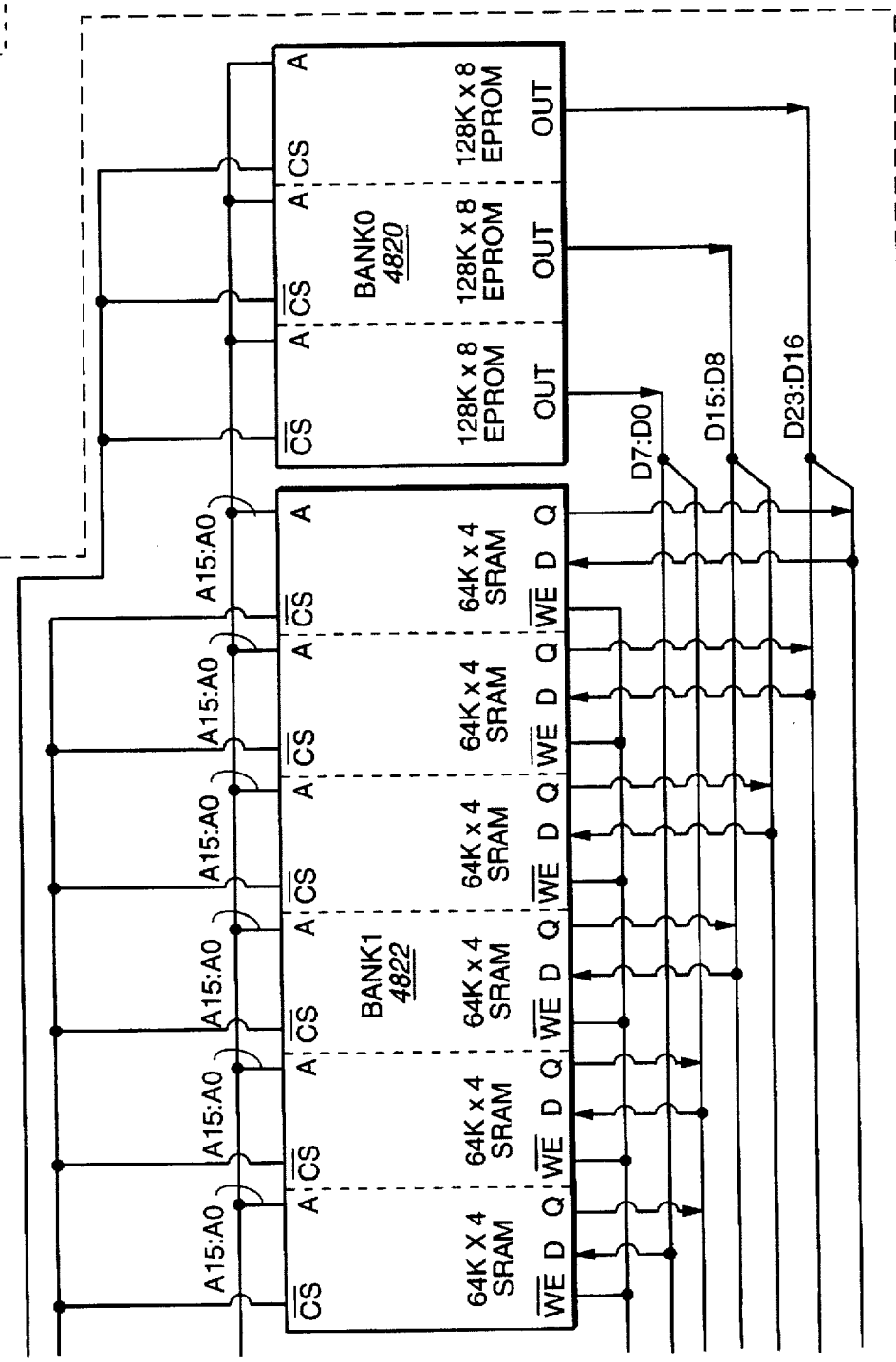

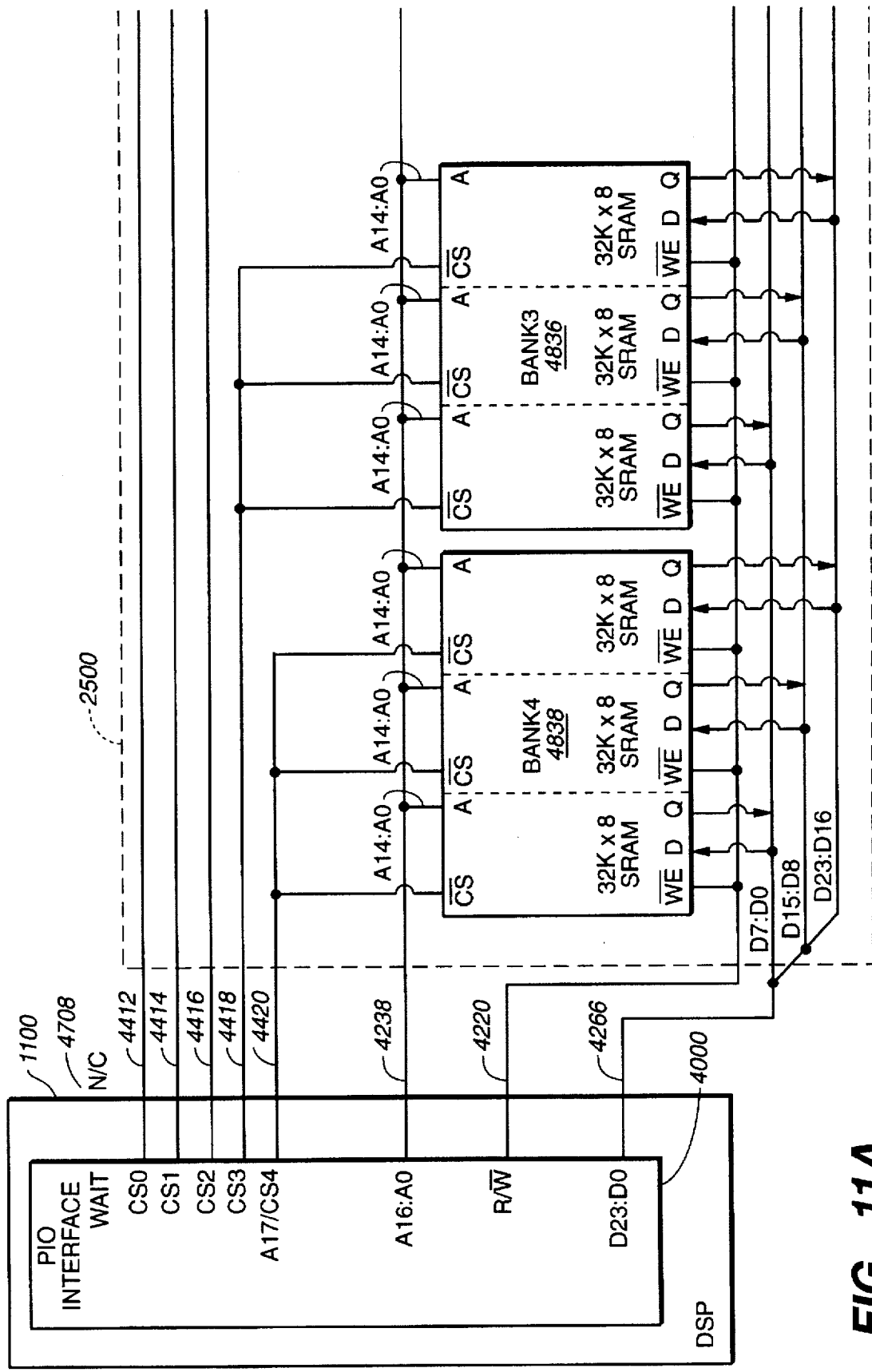
FIG._11A

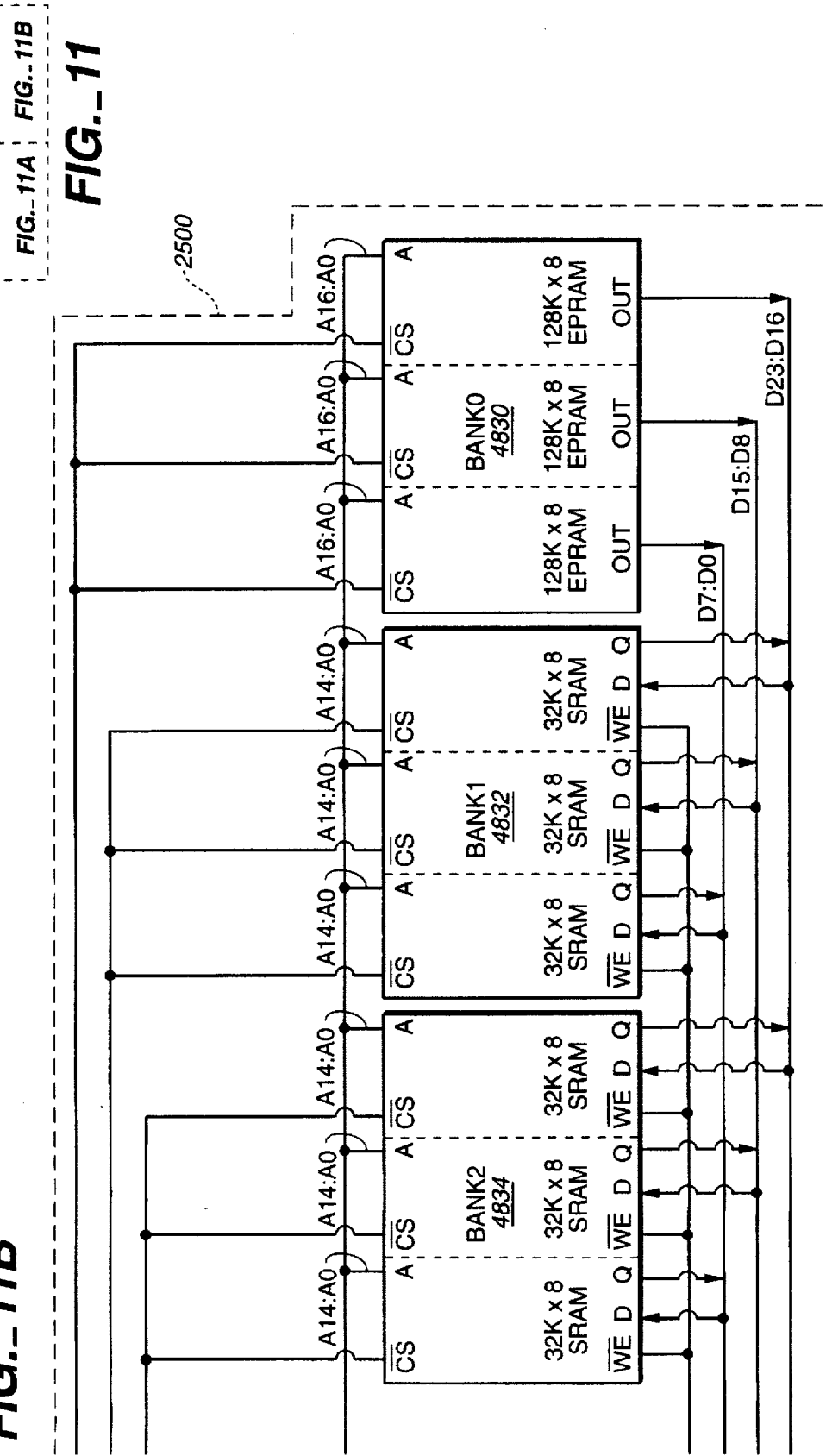

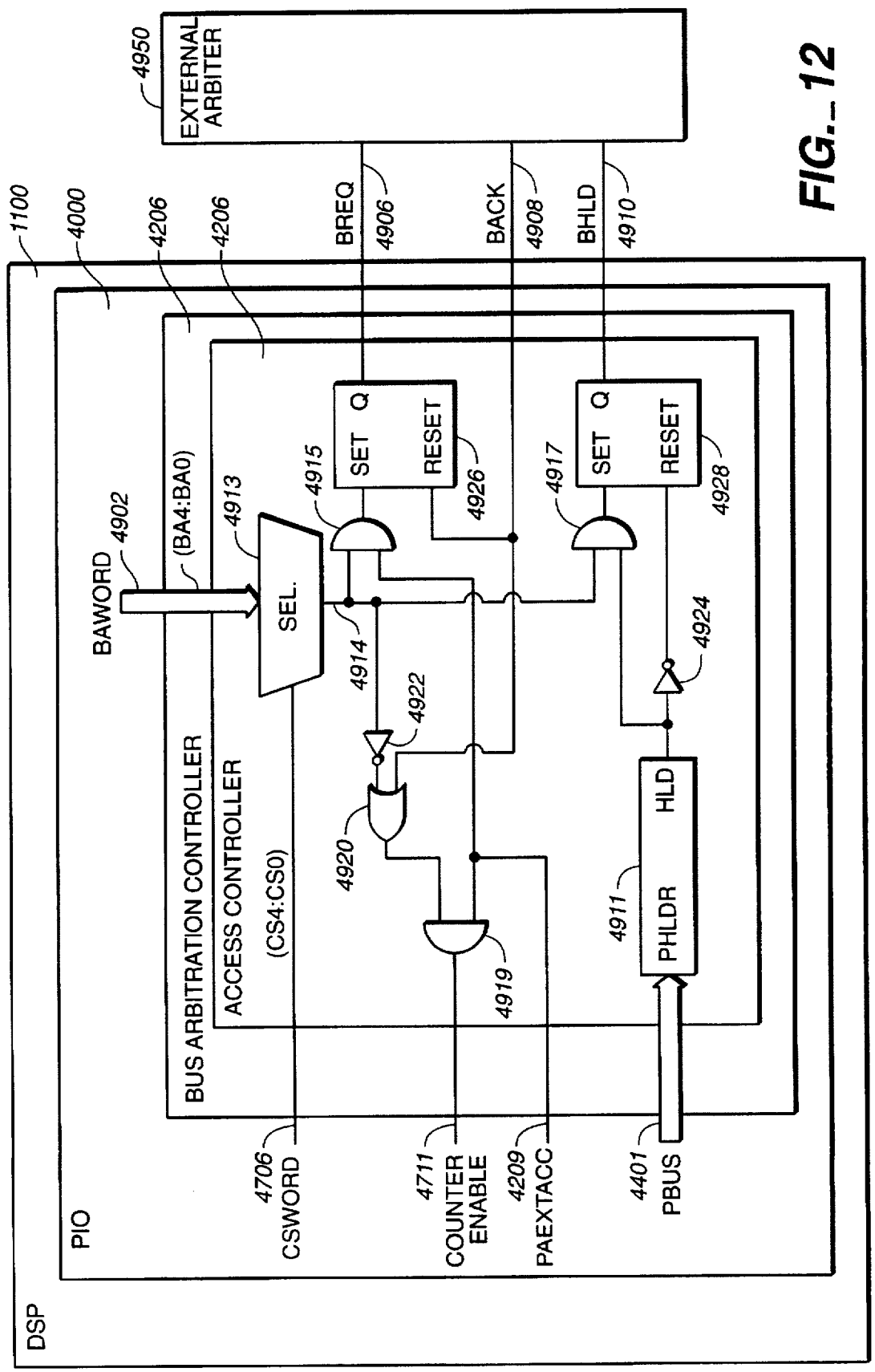
FIG._12

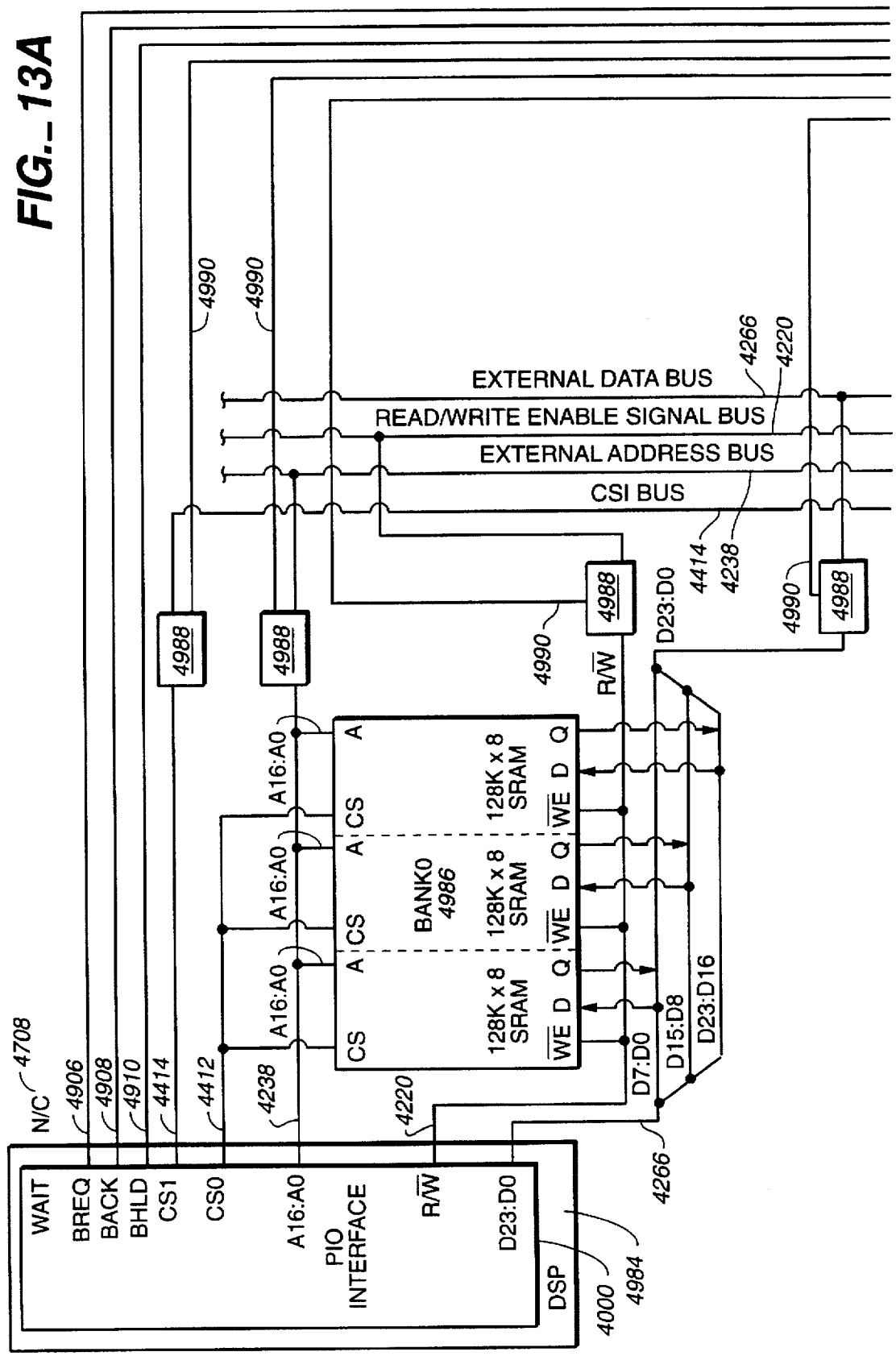
FIG._13A

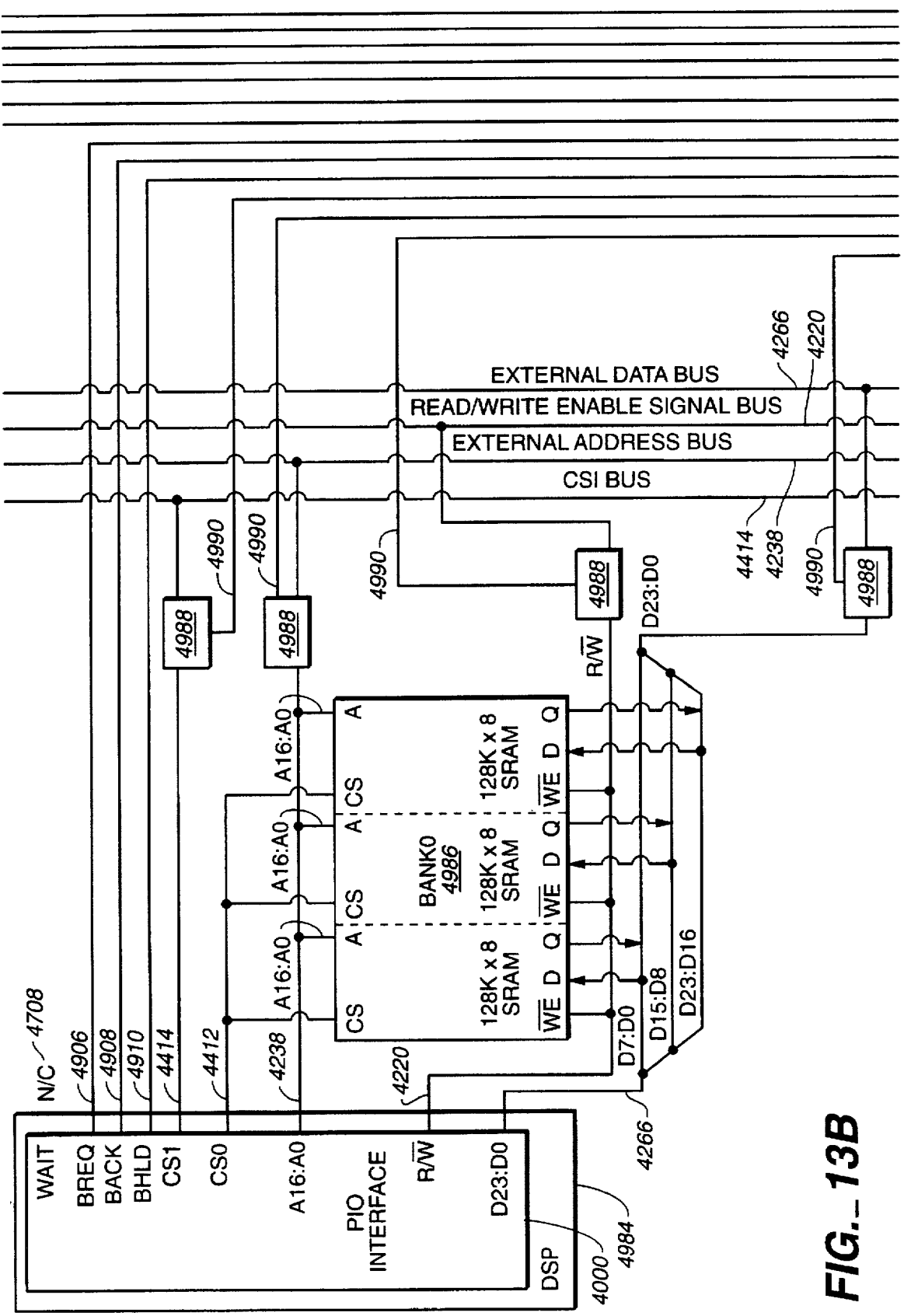
FIG._13B

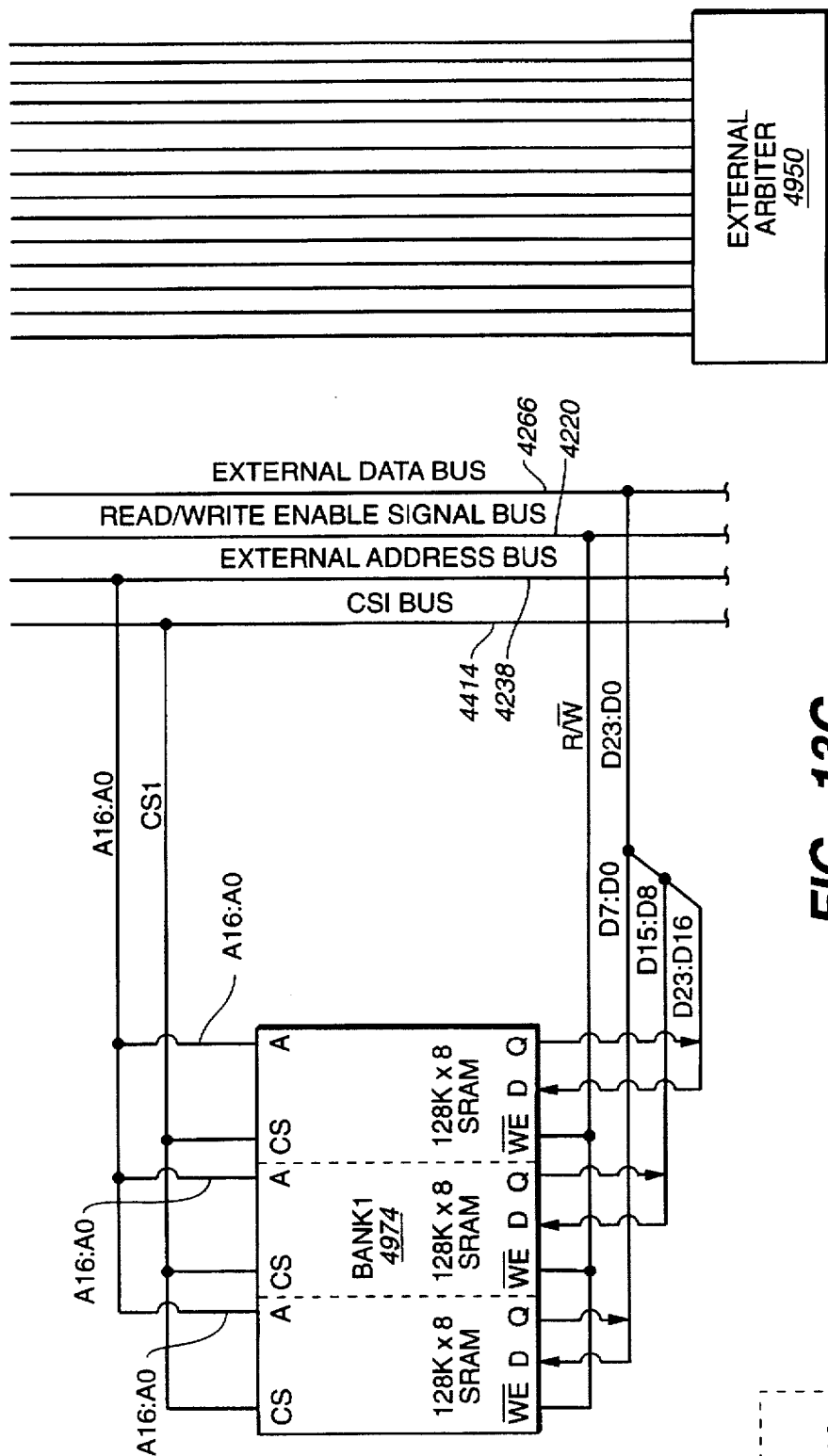
FIG._13C
FIG._13

DIGITAL SIGNAL PROCESSOR WITH ON-CHIP SELECT DECODER AND WAIT STATE GENERATOR

CROSS-REFERENCE TO RELATED APPLICATIONS

The following applications, which are assigned to the same assignee as the instant application, have been filed on the same date as the instant application and contain related subject matter. They are incorporated herein by reference.

Digital Signal Processor and Method for Executing DSP and RISC Class instruction Defining identical Data Processing or Data Transfer Operations, Kiuchi et al., U.S. patent application Ser. No. 08/127,694, abandoned in favor of Continuation U.S. patent application Ser. No. 08/443,199.

Digital Signal Processor and Method for Executing an Instruction with Variable Length Type Code, Baji et al., U.S. patent application Ser. No. 08/127,938, now abandoned.

Digital Signal Processor and Associated Method for Conditional Data Operation with No Condition Code Update, Kiuchi et al., U.S. patent application Ser. No. 08/127,691, abandoned in favor of Continuation U.S. patent application Ser. No. 08/364,418.

On Chip DMA Controller with Interrupt Functions for Digital Signal Processor, Baji, U.S. patent application Ser. No. 08/127,685, issued on Apr. 30, 1996 as U.S. Pat. No. 5,513,374.

Double Precision Division Circuit and Method for Digital Signal Processor, Nakagawa et al., U.S. patent application Ser. No. 08/127,660, issued on Jun. 20, 1995 as U.S. Pat. No. 5,426,600.

Data Processor With Control Logic for Storing Operation Mode Status and Associated Method, Kiuchi, U.S. patent application Ser. No. 08/127,679, and issued on Aug. 8, 1995 as U.S. Pat. No. 5,440,747.

On-Chip DMA Controller with Host Computer Interface, Baji et al., U.S. patent application Ser. No. 08/127,429, issued on Jul. 9, 1996 as U.S. Pat. No. 5,535,417.

Modulo Arithmetic Addressing Circuit, Shridhar et al., U.S. patent application Ser. No. 08/127,431, issued on Jan. 10, 1995 as U.S. Pat. No. 5,381,360.

The present invention relates generally to digital integrated solid state circuits. More particularly, to an apparatus for implementing a digital signal processor having a parallel interface including an on-chip address decoder and wait state generator for interfacing with and sharing external memory devices.

BACKGROUND OF THE INVENTION

The present invention provides an improvement in the interfacing and sharing of external memory devices with a digital signal processor (DSP) by means of an on-chip address decoder, wait state generator and a flexible memory architecture. The apparatus is implemented on a digital signal processor and includes an on-chip address decoder for selectably enabling external memory devices, a wait state generator for holding processor operation until the selected memory device is ready, and a memory architecture for accessing a plurality of varying speed memory devices. The memory architecture is configurable for internal or external address decoding and memory sharing with other DSP's.

One of the most timing critical aspects of DSP operation is the external memory access. In the prior art, DSP's relied on external address decoding in enabling external memory devices, and also on external wait state generator's for regulating processor performance during external memory accesses requiring more than one DSP machine cycle. Typical machine cycle length on the order of 40 nanoseconds (ns) is known in the prior art for 0.8 micrometer (micron) devices, with 20 ns spent internal to the DSP on overhead associated with accessing busses and internal gating. This leaves only typically 20 ns to perform the external decoding and memory access in order to operate in a non-wait state.

While high speed (access times of 15 ns) random access memory (RAM) is available and relatively affordable, this leaves only 5 ns to perform the external decoding out of a typical 40 ns cycle time. In the prior art, designers have resorted to using high speed Programmable Logic Arrays (PLAs) or TTL logic gates in complicated circuits to satisfy these timing requirements in implementing the external decoding devices. Although these measures have allowed for non-wait state operation in DSP's, no margin for processor improvement exists. Thus, as DSP design continues to improve, realizing machine cycles of less than 40 ns, non-wait state operation will not be able to be cost effectively realized without similar advancements in memory chip performance.

In order to improve the performance of the DSP, address decoding and wait state generation can be accomplished on the DSP chip, allowing for parallel operations and faster DSP performance by minimizing off-chip operations. DSP's with on-chip decoders and wait state generators are known in the art. Ehlig et al., U.S. Pat. No. 5,155,812, discloses a DSP with on-chip decoder and a wait state counter supporting a fixed memory bank configuration.

While on-chip address decoding is known in the art, a restricted memory configuration was heretofore required to accomplish this decoding scheme. Specifically, Ehlig et al. utilized a plurality of registers each associated with a particular block of data (8 k blocks of data for each register in the preferred embodiment of the invention, or pages of data in other embodiments). In turn, each of these registers was dedicated to a particular kind of memory storage; two dedicated registers for program memory, two dedicated registers for data storage and four dedicated registers for I/O peripherals. Each register then could be loaded with wait state information associated with the device addressed by the particular block of memory.

As such, the user was restricted in two ways: 1) the wait state registers used to store the wait state information were associated with a fixed size of memory block, each register being associated with a memory block unit (either a 8 k block or page of memory), thereby restricting the size of any individual memory component or combination of components which could be utilized, and also fixing the maximum amount of external memory available (maximum external memory is equal to the number of dedicated registers times the block size, rather than a maximum derived from the number of bits in the external address bus), and 2) the amount of external memory (numbers of blocks or pages) which could be assigned to any particular type of program resource (program, data or I/O) was restricted by the number of dedicated registers for that particular resource. While this architecture allowed for improved DSP performance, it also restricted the applications in which the DSP could be utilized due to the fixed memory architecture.

Additionally, in a multi-DSP environment, it is often desirable to share data or memory resources between a plurality of different DSP's in order to minimize cost and

SUMMARY OF THE INVENTION

To overcome the limitations of the prior art, it is an object of the present invention to implement an on-chip decoder and wait state generator which provides internal address decoding for interfacing with a plurality of varying speed external memory devices.

It is a further object of the present invention, to implement a DSP with on-chip address decoding and wait state generation including a flexible memory architecture for interfacing a plurality of external memory devices while allowing for a plurality of unrestricted memory configurations.

Finally, it is an object of the present invention to implement a DSP with on-chip address decoding, wait state generation and a flexible memory architecture for interfacing with external memory devices which is further configurable for internal or external address decoding and wait state generation and capable of sharing external memory resources in a multi-DSP environment.

The apparatus of the present invention comprises a DSP with a parallel input/output (PIO) interface including a chip select decoder for selectably enabling external memory devices. The chip select decoder includes a PIO interface chip select control register for designating a plurality of external memory configurations employing a plurality of varying speed memory devices for use in a shared memory environment. The PIO interface further includes a wait status controller including a PIO wait control register for holding processor operation until the selected memory device is ready. The PIO wait control register designates internal or external decoding and the number of internal wait states required for each bank of memory designated for internal decoding. The PIO interface further includes a Data/Address Path Controller for selectably multiplexing the address and data buses so as to provide a single address and data bus port which supports the plurality of on-chip buses. Finally, the PIO interface includes a Bus Arbitration Controller for interfacing with an external arbitrator while the DSP operates in a multi-DSP environment. The Bus Arbitration Controller further comprises a PIO Access Hold Control Register for indicating to a external bus arbitrator that the external busses should be held for the exclusive use of the requesting DSP until the entire memory operation has been completed (read/modify/write-back).

BRIEF DESCRIPTION OF THE DRAWINGS

Additional objects and features of the invention will be more readily apparent from the following detailed description and appended claims when taken in conjunction with the drawings, in which:

FIGS. 1, 1a, and 1b is a schematic of a solid-state digital electronic circuit including a digital signal processor incorporating the present invention.

FIG. 2 is a schematic of a parallel input/output interface of the digital signal processor according to a preferred embodiment of the present invention, which is coupled to an external memory.

FIG. 3a shows an exemplary external memory configuration having dedicated memory locations for use with the preferred embodiment of the present invention.

FIG. 3b shows a first external memory configuration for use with the preferred embodiment of the present invention.

FIG. 3c shows a second external memory configuration for use with the preferred embodiment of the present invention.

FIG. 3d shows a third external memory configuration for use with the preferred embodiment of the present invention.

FIG. 3e shows a fourth external memory configuration for use with the preferred embodiment of the present invention.

FIG. 4 is a schematic of the chip select decoder of the present invention.

FIG. 5 is a table of the chip select mode status derived from the decoded values of the first three most significant bits of the address of the memory location which is to be accessed and the SELECT MODE status bits (SM1:SM0).

FIG. 6 is a schematic of the circuit of the fourth chip select signal, CS4, utilized by the preferred embodiment of the present invention.

FIG. 7 is a schematic of the wait status controller of the present invention.

FIGS. 8, 8a, and 8b is a schematic of a first embodiment of the digital signal processor according to the present invention which is coupled to a single external memory bank.

FIGS. 9, 9a, and 9b, and 9c are a schematic of a second embodiment of the digital signal processor according to the present invention which is coupled to two external memory banks.

FIGS. 10, 10a, and 10b are a schematic of a third embodiment of the digital signal processor according to the present invention which is coupled to three external memory banks.

FIGS. 11, 11a, 11b are a schematic of a fourth embodiment of the digital signal processor according to the present invention which is coupled to five external memory banks.

FIG. 12 is a schematic of the bus arbitration controller of the present invention.

FIGS. 13, 13a, 13b, and 13c are a schematic of a fifth embodiment of the digital signal processors according to the present invention, which are coupled to and share an external memory bank.

DESCRIPTION OF THE PREFERRED EMBODIMENT

Referring first to FIG. 1a and 1b, a block diagram of a solid state digital electronic circuit incorporating a digital signal processor 1100 of the present invention is shown. The digital signal processor (DSP) 1100 includes a DSP program control unit 1500, a Parallel Arbiter 2100, a Direct Memory Access Controller (DMAC) 3000, a parallel input/output (PIO) interface 4000 and a Harvard Architecture with separate 24 bit internal busses for data and instructions comprising an X data bus (XD) 1102, a Y data bus (YD) 1104, a DMAC data bus (DD) 1106 and a PC instruction bus (INST) 1114. The data and instructions transferred over the XD 1102, YD 1104, DD 1106 and INST 1114 busses are accessed by pointers set respectively on the 18 bit internal address busses XA 1108, YA 1110, DA 1112 and PC 1116. In order to more clearly highlight the inventive aspects of applicant's present invention, core DSP functions and operations will not be described in this application, and instead may be found in the cross-referenced related applications incorporated previously.

The PIO interface 4000 interfaces between both the DSP core 3500 and the DMAC 3000 and the External Memory 2500 allowing for the transfer of data to and from the external memory 2500. The PIO 4000 provides on-chip address decoding for enabling the proper external memory devices, routing of the address and data words between internal and external busses, wait status control, and interfaces with an external bus controller for DSP 1100 access to shared memory resources. Referring now to FIG. 2, PIO 4000 of the DSP 1100 comprises a Wait Status Controller 4200, a Chip Select Decoder 4202, a Data/Address Path Controller 4204, a Bus Arbitration Controller 4206 and a Pin Buffer 4208.

When an external memory access is requested by either the DMAC 3000 or the DSP core 3500, the Data/Address Path Controller 4204 and Chip Select Controller 4202 in PIO interface 4000 receive one of five enabling signals PAEXTACC 4209, PASELX 4210, PASELY 4212, PASELP 4214 and PASELD 4216 from the Parallel Arbiter 2100. A low signal on PAEXTAC 4209 indicates an external memory access is requested, while the remaining four enable signals indicate which of the four data or instruction busses XD 1102, YD 1104, DD 1106 or INST 1114 (and associated address bus XA 1108, YA 1110, DA 1112 or PC 1116) are to be utilized for the memory access. Similarly, the Data/Address Path controller 4204 in PIO interface 4000 receives three read/write signals AUXRD 4217, AUYRD 4218 and DMACRD 4219 to designate the type of external memory operation that is being requested. The Data/Address Path Controller 4204 in the PIO 4000 subsequently generates a PIO read/write signal R/W 4220 to initiate the read or write operation utilizing the designated address and data bus.

The address busses XA 1108, YA 1110, DA 1112 and PC 1116 are received by the PIO 4000 and coupled to a first selector 4230. The first selector 4230 receives a first control signal 4232 from the Data/Address Path Controller 4204, thereby selecting one of the four address busses XA 1108, YA 1110, DA 1112 or PC 1116 to be coupled to the first selector output 4234 for transmission of the requested address to the external memory 2500. The first selector output 4234 is coupled to a first output buffer 4236 in the Pin Buffer 4208 via the PIO internal address bus 4237, whose output is in turn coupled to an external address bus EXABUS 4238 for transmission of the address pointing to the location in external memory 2500 to be accessed. In the preferred embodiment of the present invention, the 17 address bits A16:A0 are transmitted by the buffer 4236 via the EXABUS 4238 to the external memory 2500 in all of the embodiments shown in FIGS. 8–11, while, in the embodiment of FIG. 8b, the most significant address bit A17 is transmitted separately by the buffer 4606 via the EXABUS 4238, as will be described in further detail below.

The data busses XD 1102, YD 1104 and DD 1106 are received by the PIO 4000 and coupled to the three inputs of a second selector 4250 and also individually to the output of one of three read buffers XRB 4252, YRB 4254, DRB 4256. Similarly, the Instruction bus INST 1114 is coupled to the output of read buffer PCRB 4258. If a write operation is designated by the AUXRD 4217, AUYRD 4218 or DMACRD 4219 signals, then a second control signal 4260 is generated by the Data/Address Path Controller 4204. The second control signal 4260 is coupled to the second selector 4250 thereby selecting one of the three data busses XD 1102, YD 1104 or DD 1106 to be coupled to a second selector output 4262 for transmission of data to the external memory 2500. The second selector output 4262 is coupled to a second output buffer 4264 in the Pin Buffer 4208. An enabling third control signal 4265 coupled from the Data/Address Path Controller 4204 to the second output buffer 4264, is set to enable or disable the output buffer depending on the type of memory operation requested (read or write). The output of the second output buffer 4264 is in turn coupled to the external data bus EXDBUS 4266 for transmission of data to or from the memory location designated by the external address bus EXABUS 4238 in the external memory 2500.

The four read buffers XRB 4252, YRB 4254, DRB 4256 and PCRB 4258 are coupled to the Data/Address Path Controller 4204 by means of four data bus read control signals XDRENAB 4280, YDRENAB 4282, DDRENAB 4284 or PCRENAB 4286. If a read operation is designated, then one of the four data bus read control signals XDRENAB 4280, YDRENAB 4282, DDRENAB 4284 or PCRENAB 4286 is enabled to allow the data or instruction which is to be read to arrive on the correct internal bus. The inputs of the four read buffers XRB 4252, YRB 4254, DRB 4256 and PCRB 4258 are coupled to the internal PIO data bus PIODATA 4288, which in turn is coupled to the output of a first input buffer 4290 of the Pin Buffer 4208. In the preferred embodiment, the data bus read control signals XDRENAB 4280, YDRENAB 4282, DDRENAB 4284 or PCRENAB 4286 are generated by Data/address Path Controller 4204 and are directly responsive to the four enabling signals PASELX 4210, PASELY 4212, PASELP 4214 and PASELD 4216. The input to the first input buffer 4290 is coupled to the external data bus EXDBUS 4266 for transmission of data from the memory location designated by the external address bus EXABUS 4238 in the external memory 2500.

Referring now to FIGS. 3a–3e, the external memory structure of the preferred embodiment of the present invention is shown. The address space assigned to external memory may be structured into one of four basic configurations, in which up to five separate memory devices with varying access performance characteristics may be employed. In the preferred embodiment of the present invention, space in external memory may be reserved or dedicated to a particular resource as is required, by blocking out certain address locations. One such configuration is shown in FIG. 3a, whereby the external memory has been divided into dedicated blocks for 1) interrupt vectors, 2) instructions only, 3) memory mapped peripherals, 4) data only, and 5) general purpose (instructions or data).

Specifically, FIG. 3a shows a DSP memory configuration in which 64 words are dedicated to interrupt vectors, 960 words are dedicated to instructions, 2 k words dedicated to data, 3 k words for memory mapper peripherals and 250 k words for general purpose. In the prior art, in order to accommodate the memory requirements as highlighted in FIG. 3a, one 8 k (or page) memory device would be required for Instructions, one 8 k device for I/O and one 8 k device for data. As such, the user would have to allocate more space than is required to satisfy similar dedication requirements (dedicating more than 8 times the memory required in the case of program instructions—8 k when only 960 words are required). Even more restricting, a DSP implementing the fixed memory architecture of the prior art would be left with but one register to hold wait state information for any remaining external memory device which a user may wish to utilize for either data or instructions.

Unlike the fixed memory architecture of the prior art, the present invention does not require entire memory devices comprising whole banks or pages of memory to be dedicated to each DSP resource that requires some small portion of external memory. As shown in FIGS. 3a–3e, the four configurations and up to five associated memory devices may contain dedicated fields for certain DSP resources, but the remaining external memory is freely accessible, not restricted to a particular resource. Further, the present invention allows for the storage of one or all of the resource dedication requirements in the same bank of data, clearly indicative of a superior memory architecture in which entire banks of memory are not restrictively tied to individual DSP resources.

In the preferred embodiment, the external memory 2500 comprises 256K words, in which each word is 24 bits in length. Those ordinarily skilled in the art will recognize that other address space sizes, word lengths or numbers of words may be selected as required without departing from the inventive spirit of the present invention. Additionally, while four memory configurations have been identified according to common memory device sizes, other or more numerous configurations may be employed without departing from the inventive spirit of the present invention.

Referring first to FIG. 3b, a first memory configuration SELECT MODE 00 is shown comprising a single bank (BANK0) 4300 of external memory. In the first memory configuration, BANK0 4300 comprises the full 256 k words of external memory 2500 which are addressable by the 18 bit external address bus EXABUS 4238 and are responsive to addresses 00000-3FFFF (in hexadecimal).

Referring next to FIG. 3c, a second memory configuration SELECT MODE 01 is shown comprising a first bank (BANK0) 4300 and second bank (BANK1) 4302 of external memory. BANK0 4300 comprises the first 128 k words of external memory 2500 responsive to addresses 00000-1FFFF, while BANK1 4302 comprises the remaining 128K words of external memory 2500 responsive to addresses 20000-3FFFF. In the preferred embodiment of the present invention, the most significant bit A17 will determine which 128 k bank is being addressed by the 18 bit external address bus EXABUS 4238 (BANK0 4300 if A17 is 0, or BANK1 4302 if A17 is 1).

Referring next to FIG. 3d, a third memory configuration SELECT MODE 10 is shown comprising a first bank (BANK0) 4300, second bank (BANK1) 4302 and third bank (BANK2) 4304 of external memory. BANK0 4300 comprises the first 128 k words of external memory 2500 responsive to addresses 00000-1FFFF, while BANK1 4302 comprises the next 64 k words responsive to addresses 20000-2FFFF and BANK2 4304 comprises the remaining 64 k words of external memory responsive to addresses 30000-3FFFF. In the preferred embodiment of the present invention, the most significant bit A17 will determine if bank BANK0 4300 is addressed (BANK0 4300 if A17 is 0) while the combination of bit A17 and bit A16 will determine if BANK1 4302 or BANK2 4304 will be accessed by the 18 bit external address bus EXABUS 4238 (BANK1 4302 if A17=1 and A16=0, BANK2 4304 if A17=1 and A16=1.

Referring next to FIG. 3e, a fourth memory configuration SELECT MODE 11 is shown comprising a first bank (BANK0) 4300, second bank (BANK1) 4302, third bank (BANK2) 4304, fourth bank (BANK3) 4306 and fifth bank (BANK4) 4308 of external memory. BANK0 4300 comprises the first 128 k words of external memory 2500 responsive to addresses 00000-1FFFF; BANK1 4302 comprises the next 32 k words responsive to addresses 20000-27FFF; BANK2 4304 comprises the next 32 k words of external memory responsive to addresses 28000-2FFFF; BANK3 4306 comprises the next 32 k words of external memory responsive to addresses 30000-37FFF; finally, BANK4 4308 comprises the remaining 32 k words of external memory responsive to addresses 38000-3FFFF. In the preferred embodiment of the present invention, the most significant bit A17 will determine if BANK0 4300 is addressed (BANK0 4300 if A17 is 0) while the combination of bit A17, bit A16 and bit A15 will determine if BANK1 4302, BANK2 4304, BANK3 4306 or BANK4 4308 will be accessed by the 18 bit external address bus EXABUS 4238 (BANK1 4302 if A17=1 and A16 & A15=0; BANK2 4304 if A17 & A15=1 and A16=0; BANK3 4306 if A17 & A16=1 and A15=0; and BANK4 4308 if A17, A16 & A15=1).

Referring now to FIG. 4, the Chip Select Decoder 4202 of the preferred embodiment of the present invention is shown. The Chip Select Decoder 4202 is programmable to reflect the external memory configuration desired and provides external memory device enabling according to the particular address requested and the external memory configuration programmed. The Chip Select Decoder 4202 includes PIO chip select mode register PCSR 4400. In the preferred embodiment of the present invention, the chip select mode register PCSR 4400 is 7 bits BA4:SM0. Bits BA:BA0 in the chip select mode register 4400 are dedicated to bus arbitration, with each bit corresponding to one of the 5 memory banks (BANK4-BANK0) accessible via the 4 different memory configurations shown previously in FIGS. 3b-3e. As shown in FIG. 4, the chip select mode register PCSR 4440 may be read from or written to by the DSP by means of the peripheral bus PBUS 4401 comprising the peripheral data bus PDBUS, peripheral address bus PABUS, the peripheral select bus PSELBUS and the peripheral read/write bus PRDBUS. For clarity purposes the control and operation of the PBUS 4401 will not be disclosed, but may be found in the related application On Chip DMA Controller with Interrupt Functions for Digital Signal Processor, Baji, U.S. patent application Ser. No. 08/127,685, now U.S. Pat. No. 5,513,374. The bus arbitration bits BA4:BA0 will be set for a particular bank of memory only if that bank will be shared in a multi-DSP environment. Those ordinarily skilled in the art will recognize that as the memory configurations vary, the number of status bits will vary, always maintaining a one to one correspondence to the total number of memory banks which are allocated for sharing in a multi-DSP environment. The use of the bus arbitration bits of the chip select mode register 4400 will be described in greater detail below in regards to the bus arbitration controller 4206.

The chip select mode register 4400 also includes bits SM1:SM0 which are programmable, in binary form, to reflect or identify the particular external memory configuration being utilized of the 4 different external memory configurations available to the DSP 1100. For example: a (SM1,SM0) value of (0,0) corresponds to SELECT MODE 00 with external memory configured as a single 256 k bank, BANK0 4300; a (SM1,SM0) value of (0,1) corresponds to SELECT MODE 01 with external memory configured as two 128 k banks, BANK0 4300 and BANK1 4302; a (SM1,SM0) value of (1,0) corresponds to SELECT MODE 10 with external memory configured as one 128 k bank, BANK0 4300, and two 64 k banks, BANK1 4302 and BANK2 4304; and finally a (SM1,SM0) value of (1,1) corresponds to SELECT MODE 11 with external memory configured as one 128 k bank, BANK0 4300, and four 32 k banks, BANK1 4302, BANK2 4304, BANK3 4306 and BANK4 4308.

Chip Select Decoder 4202 further comprises a decoder circuit 4402 with inputs XAB(17:15) 4404, YAB(17:15) 4406, DAB(17:15) 4408 and PCB(17:15) 4410 corresponding to the three most significant bits of each address bus XA 1108, YA 1110, DA 1112 and PC 1116 respectively. As described previously, the Chip Select Decoder 4202 also receives the five enabling signals PAEXTACC 4209, PASELX 4210, PASELY 4212, PASELP 4214 and PASELD 4216 from the Parallel Arbiter 2100 (shown in FIG. 1a), indicating an external access request and which of the four data or instruction busses XD 1102, YD 1104, DD 1106 or INST 1114 (and associated address bus XA 1108, YA 1110, DA 1112 or PC 1116) are to be utilized for the memory access. When an external memory access is to be performed, the chip select decoder 4202 first determines which bus is to be utilized as described previously by means of four enabling signals PASELX 4210, PASELY 4212, PASELP 4214 and PASELD 4216 from the Parallel Arbiter 2100, then decodes the appropriate three bit inputs A17, A16 and A15 corresponding to the memory location to be accessed.

In the preferred embodiment of the present invention, each of the eight possible permutations of the 3 most significant bits (A17,A16,A15) corresponds to a particular 32 k block of the external memory 2500. In the preferred embodiment, a decoded value of (0,0,0) corresponds to the 32 k block of external memory responsive to addresses 00000-07FFF; a decoded value of (0,0,1) corresponds to the 32 k block of external memory responsive to addresses 08000-0FFFF; a decoded value of (0,1,0) corresponds to the 32 k block of external memory responsive to addresses 10000-17FFF; a decoded value of (0,1,1) corresponds to the 32 k block of external memory responsive to addresses 18000-1FFFF; a decoded value of (1,0,0) corresponds to the 32 k block of external memory responsive to addresses 20000-27FFF; a decoded value of (1,0,1) corresponds to the 32 k block of external memory responsive to addresses 28000-2FFFF; a decoded value of (1,1,0) corresponds to the 32 k block of external memory responsive to addresses 30000-37FFF; and finally a decoded value of (1,1,1) corresponds to the 32 k block of external memory responsive to addresses 38000-3FFFF.

According to the preferred embodiment of the present invention, after the initial decode of the three most significant bits A17:A15 in which the particular 32 k block of data is determined, the particular bank of data that is requested to be accessed can be determined by the status of bits SM1:SM0 of the chip select mode register 4400. As described previously the bits SM1:SM0 reflect the particular external memory configuration being utilized of the 4 different external memory configurations available to the DSP 1100. By utilizing the SM1:SM0 bits from chip select mode register 4400, coupled with three most significant bits of the address to be accessed A17:A15, the chip select decoder 4202 generates one of five chip enable or select signals CS0 4412, CS1 4414, CS2 4416, CS3 4418 AND CS4 4420. The chip Select signals CS0 4412, CS1 4414, CS2 4416, CS3 4418 and CS4 4420 are utilized to select the particular bank of external memory that is to be accessed by providing a logical low level enabling signal to the selected memory device. For example: a SM1:SM0 value of (0,0) corresponds to SELECT MODE 00 with external memory configured as a single 256 k bank of external memory (BANK0 4300). This information coupled with any combination of address bits A17:A15, will result in chip select CS0 4412 being enabled low, while the remaining chip select lines are held high.

Referring now to FIG. 5, a table mapping the resultant chip select status derived from the combinations of the (SM1:SM0) bits from the chip select register 4400 and the decoded 3 most significant bits of the desired address (from XAB(17:15) 4404, YAB(17:15) 4406, DAB(17:15) 4408 or PCB(17:15) 4410) is presented. The chip select status reflects the output of the chip select decoder 4202 on the chip select enable output lines CS0 through CS4. As is indicated in the table, only one chip select line will be held low for any given memory operation, with the remaining chip select lines being held high. Those ordinarily skilled in the art will recognize that the circuitry required to implement the matrix presented may be accomplished in numerous ways as is known in the art, the most simple of which is an optimized circuit utilizing AND, NAND, OR and NOR gates.

However, in the preferred embodiment of the present invention chip select CS4 4420 is implemented in a unique manner. When the chip select mode as defined by bits (SM1:SM0) of the PIO chip select register 4400 is set to (0:0) SELECT MODE 00 (external memory 2500 is configured as one single 256 k bank, BANK0), then the most significant bit A17 of the memory address to be accessed must be transmitted to the external memory 2500 in order to access the entire 256 k addressable memory locations. Those ordinarily skilled in the art will recognize that in each of the other memory configurations, the most significant bit A17 is not required to be transmitted to external memory. This is because the chip selects CS0–CS4 will enable the proper memory bank, by means of the chip select decoding matrix, thereby removing the requirement of transmitting this portion of the asserted address to any memory bank in the remaining three memory configurations. As such the present invention incorporates a unique method of transmitting a fifth enabling signal to a memory device by utilizing existing hardware paths.

Referring now to FIG. 6, the generation of the fifth chip select CS4 4420 is shown as implemented in the preferred embodiment of the present invention. The most significant bit A17 of the address indicating the requested memory location is tapped off of the internal PIO address bus 4237 (shown in FIG. 2 by means known in the art, and coupled to a Pin Buffer Selector 4600 at a first input port 4601. The chip select signal CS4 4420, generated by the chip select decoder 4202 according to the matrix of FIG. 5, is coupled to a second input port 4602 of the Pin Buffer Selector 4600. A first chip select decoder control signal SELCS4 4603 is generated by the chip select decoder 4202, whereby if the chip select mode or configuration is set to SELECT MODE 00 (a SM1:SM0 value of 0:0), the most significant address bit A17 coupled to the first input port 4601 is passed to the Pin Buffer Selector output 4604 of the Pin Buffer Selector 4600. Alternatively, if the chip select mode is set to any of the remaining three configurations (a SM1:SM0 value of 0:1, 1:0 or 1:1), the CS4 4420 signal is passed to the Pin Buffer Selector output 4604. The Pin Buffer Selector output 4604 is coupled to a third output buffer 4606 in the Pin Buffer 4208, whose output, comprising either the CS4 4420 chip select signal or the most significant address bit A17 of the requested memory location, is coupled to the external memory 2500.

The Wait Status Controller 4200 of the preferred embodiment of the present invention is shown in FIG. 6, including a PIO wait control register PWCR 4700. The Wait Status Controller 4200 informs the parallel arbiter 2100 which informs the requesting device (either the DMAC 3000 or the DSP core 3500), how long it must wait until valid data exists on the data bus for read operations, or how long it must assert data onto the data bus for a given write operation to a particular external memory device. The present invention accomplishes this through a selectable wait state generation means which provides for the generation of internal on-chip wait state generation or allows for external wait state generation to be employed.

In the preferred embodiment, the PIO wait control register PWCR 4700 comprises a 20-bit register for storing five 4-bit wait state packets of data associated with the external memory configuration. Each four bit wait state packet includes a first wait status bit $WS_j$ and three wait state count bits $W_{j2}$, $W_{j1}$ and $W_{j0}$ (j representing a variable with values from 0-4). As shown in FIG. 7, the wait control register PWCR 4700 may be read from or written to by the DSP my means of the PBUS 4401 comprising the peripheral data bus PDBBUS, peripheral address bus PABUS, the peripheral select bus PSELBUS and the peripheral read/write bus PRDBUS. The $WS_j$ wait status bit is set low if wait state generation is to be internal (i.e., on-chip) for the particular memory bank selected. Alternatively, $WS_j$ will be set high if external wait state generation is to be utilized. The three wait state count bits $W_{j2}$, $W_{j1}$ and $W_{j0}$ are programmable to indicate (in binary) the number of counts to wait, from 0 to 7 DSP machine cycles, associated with the particular memory bank selected when internal wait state generation has been enabled.

As was described previously, in the preferred embodiment the external memory can be divided into as many as 5 separate banks of data (BANK0 4300, BANK1 4302, BANK2 4304, BANK3 4306 and BANK4 4308). A four bit packet including one wait status bit ($WS_j$) and 3 wait state bits ($W_{j2}$:$W_{j0}$) are assigned to each bank of data, thereby enabling each bank of data to be programmed for internal or external wait state generation, and also enabling the assignment of a different wait state count value for each bank. For example, BANK0 is assigned the 4 least significant bits of the PIO wait control register 4700, including wait status bit $WS_0$ and three wait state count bits $W_{00}$, $W_{01}$ and $W_{02}$. Similarly, each of the remaining 4 banks of external memory, whose availability depends on the memory configuration selected, is provided with a dedicated 4 bit packet in the PIO wait control register PWCR 4700.

The Wait Status Controller 4200 further includes a wait state generator WSG 4702 having clock input CLK0 4703 and CLK1 4704, chip select control word input CSWORD 4706, external wait status input WAIT 4708, wait status control word input WSWORD 4710, counter enable 4711 and wait release output signal PIWRL 4712. The clock inputs CLK0 4703 and CLK1 4704 are received from the timing unit 1300 and provide clocking signals for executing operations based on the internal machine cycle for the DSP 1100. The chip select control word input CSWORD 4706 comprises a 5 bit word (CS4:CS0) which reflects the status of the five chip select signals (CS0 4412, CS1 4414, CS2 4416, CS3 4418 and CS4 4420). The external wait status input WAIT 4708 provides the wait state generator WSG 4702 a ready signal from an external wait state generator when the particular bank of memory being accessed has been programmed for external wait state generation. The counter enable 4711 initializes the counter for operation and is generated by the bus arbitration controller 4206 (shown in FIG. 2). The details of the counter enable signal 4711 will be discussed in greater detail below in conjunction with the bus arbitration controller 4206. The wait status control word input WSWORD 4710 comprises a 20 bit word which reflects the status of the 20 bits of the PIO wait control register 4700.

According to the preferred embodiment of the present invention, after the chip select decoder 4202 has decoded the three most significant bits of the memory address to be accessed, the wait state generator 4702 in the PIO interface 4000 must determine whether or not the particular memory bank to be accessed requires internal or external memory wait generation. If the internal wait state generation is required, then the internal wait state generator 4702 will "count" the appropriate number of wait states based on the values stored in the PIO wait control register PWCR 4700 associated with the particular memory bank addressed.

Specifically, the wait state generator 4702 is further comprised of a first selector 4713 and a second selector 4714, a comparator 4716, a counter 4718, and latch 4720. The wait status control word WSWORD 4710 is coupled to the input of the first selector 4713, whose output is controlled by chip select control word CSWORRD 4706. The first selector functions to isolate from the 20 bits of the WSWORD 4710 input which 4 bits are associated with the particular memory bank to be accessed by means of the status of the 5 chip select lines found in CSWORD 4704. The three wait state count bits $W_{j2}$, $W_{j1}$ and $W_{j0}$ corresponding to the number of internal wait counts for the requested bank of memory are coupled from the first selector 4713 to a first comparator input 4722 of the comparator 4716, while the $W_{aj}$ bit is coupled to the second selector 4714 to control which input the second selector couples to its output port 4723.

The two clock signals CLK0 4703 and CLK1 4704 and counter enable signal 4711 are coupled to the counter 4718, whose output is coupled to the second comparator input 4724 of comparator 4716. The counter 4718 upon receiving its enable signal 4711, counts DSP machine cycles and provides a three bit binary signal reflecting that count to the comparator 4716. The comparator 4716 compares the value of the count with the value received from the 3 bits from WSWORD reflecting the requested wait states and provides an internal wait release signal output coupled to the first input of the second selector 4714 when the two counts are equal. The external wait status input WAIT 4708 is coupled to the input of the latch 4720 whose output is in turn coupled to the second input of the second selector 4714. The latch is sampled at the falling edge of the CKO 4703 pulse and provides the external wait release signal to the second selector. The second selector produces an ouput wait release signal PIWRL 4712 (based on the $W_{aj}$ bit provided from the first selector indicative of either internal or external wait generation) after either the expiration of the correct amount of clock cycles in an internal wait mode or the release from the external device. Finally, the wait release signal PIWRL 4712 from second selector 4714 is coupled to the reset port of the counter 4718 to reset the count status in preparation for the next counter enable signal 4711.

If external wait state generation is indicated by the wait state status bit associated with the particular bank of data to be accessed, then the wait state generator will wait to receive a ready signal on Wait 4708 from the external wait state generator to signify the external memory bank is ready to be accessed. In either case, upon completion of the wait state for the particular bank, the wait state generator will issue the wait release output signal PIWRL 4712 to the parallel arbiter 2100 (FIG. 1) to indicate that the data memory location to be accessed is available.

FIGS. 8-11 are now presented illustrative of the four distinct external memory configurations SELECT MODE 00, 01, 10 and 11. In each embodiment, a digital signal processor incorporating the present invention is shown coupled to a particular combination of memory devices which conform to the memory architecture described herein. The particular devices described including types of memory and the configuration of any modules is illustrative only and should not be construed as limiting.

Referring now to FIGS. 8a and 8b a first embodiment of the present invention is shown whereby DSP 1100 is coupled to a single 256K word external memory 4800. External memory 4800 is a specific example of a particular type of 256 k word memory device which is representative of the generic 256 k device BANK0 4300 described previously. In the first embodiment, the external memory 4800 is comprised of a 256 k word by 24 bit Static Random Access Memory (SRAM) module, including three 256 k word by 8 bit SRAMs manufactured by Hitachi America, LTD, Tarrytown, N.Y. Those ordinarily skilled in the art will recognize that any memory device with an appropriate memory capacity may be utilized, and therefore the selection of a Hitachi memory device should not be construed as limiting. Upon the receipt of one of the four internal bus select signals PASELX 4210, PASELY 4212, PASELP 4214 or PASELD 4216 and one of the read/write control signals AUXRD 4217, AUYRD 4218 or DMACRD 4219, the first three bits of the address of the memory location to be accessed are decoded by the chip select decoder 4202. The PIO interface 4000 then utilizes this information along with the select mode information (SM1:SM0) stored in the PIO chip select register PCSR 4400 to determine which bank of memory is to be accessed. In this configuration, bits (SM1:SM0) will be programmed to (0:0) corresponding to memory configuration SELECT MODE 00 in which the external memory is a single 256 k bank.

External address bus 4238 receives the full 18 bit address from the PIO 4000 via the first output buffer 4236 (bits A16:A0) and third output buffer 4606 (bit A17). Responsive to the AUXRD 4217, AUYRD 4218 AND DMACRD 4719 signals, the data address path controller 4204 will enable the read/write output R/W 4220 so as to allow the data to pass along the external data bus 4266. According to this first embodiment, the chip select decoder 4202 will assert a logical low signal on the chip select line CS0 4412 thereby enabling the 256 k bank of external memory 4800. Simultaneously, the wait status controller 4200 determines if internal or external wait state generation is required by examining the $WS_0$ bit of the PIO wait control register PWCR 4700. If internal wait state generation is required, the wait state generator will begin to count down the number of machine cycles according to the value stored in bits $W_{02}$, $W_{01}$ and $W_{00}$ of the PIO wait control register PWCR 4700. If external wait state generation is required, then instead of not being connected (N/C) as shown in FIG. 8b, the external wait status input 4708 will be connected to an external wait state generator (not shown) and the wait state generator WSG 4702 will monitor the external wait status input 4708 for a ready signal designating the external memory 4800 has asserted the requested data on the data bus or is ready to receive data. Finally, upon completion of the wait state for BANK0, the wait state generator will issue the wait release output signal PIWRL 4712 to the parallel arbiter 2100 to indicate that the data memory location to be accessed is available.

Referring now to FIGS. 9, 9a, 9b, and 9c a second embodiment of the present invention is shown whereby DSP 1100 is coupled to a 128 k word by 24 bit SRAM module 4810 BANK1 and a 128 k word by 24 bit erasable programmable read only memory (EPROM) module 4812 BANK0. External memory 4810 and 4812 are specific examples of two particular types of 128 k word memory devices which are representative of the generic 128 k devices BANK0 4300 and BANK1 4302 described previously. In this configuration, the PIO 4000 utilizes the mode information (SM1:SM0) stored in the PIO chip select register PCSR 4400 to determine which bank of memory, BANK0 or BANK1, is to be accessed. In this configuration, bits (SM1:SM0) will be programmed to (0:1) corresponding to memory configuration SELECT MODE 01 in which the external memory is configured in two 128 k memory banks.

External address bus 4238 receives only 17 bits (A16:A0) of the requested address from the PIO 4000 via the first output buffer 4236. According to this second embodiment, the chip select decoder 4202 will assert a logical low signal on the chip select line CS0 4412 or CS1 4414 based on the decoded three most significant bits of the address being accessed, thereby enabling the correct 128 k bank of external memory. Simultaneously, the wait status controller 4200 determines if internal or external wait state generation is required by examining the $WS_0$ or $WS_1$ bit of the PIO wait control register PWCR 4700. If internal wait state generation is required, the wait state generator will begin to count the number of machine cycles according to the value stored in bits $W_{02}$, $W_{01}$ and $W_{00}$ (or $W_{12}$, $W_{11}$ and $W_{10}$ if BANK1 is accessed) of the PIO wait control register PWCR 4700. Finally, after the count by the wait state generator or receipt of the external release signal, the wait state generator 4702 will transmit the release signal PIWRL 4712 to the parallel arbiter 2100 to signify that the external memory device 2500 requested is available for access.

Referring now to FIGS. 10, 10a and 10b, a third embodiment of the present invention is shown whereby DSP 1100 is coupled to a 128 k word by 24 bit EPROM module 4820 (BANK0) and two 64 k word by 24 bit SRAM modules 4822 (BANK1) and 4824 (BANK2). External memory devices 4820, 4822 and 4824 are specific examples of one particular type of 128 k word memory device and two particular types of 64 k word memory devices which are representative of the generic 128 k and 64 k devices BANK0 4300, BANK1 4302 and BANK2 4304 described previously. In this configuration, the PIO 4000 utilizes the mode information (SM1:SM0) stored in the PIO chip select register PCSR 4400 to determine which bank of memory, BANK0, BANK1 or BANK2, is to be accessed. In this configuration, bits (SM1:SM0) will be programmed to (1:0) corresponding to memory configuration SELECT MODE 10 in which the external memory is configured with one 128 k and two 64 k memory banks.

External address bus 4238 receives only 17 bits A16:A0 of the requested address from the PIO 4000 via the first output buffer 4236. According to this third embodiment, the chip select decoder 4202 will assert a logical low signal on the chip select line CS0 4412, CS1 4414 or CS2 4416 based on the decoded three most significant bits of the address being accessed, thereby enabling the correct bank of external memory. Simultaneously, the wait status controller 4200 determines if internal or external wait state generation is required by examining the $WS_0$, $WS_1$ or $WS_2$ bit of the PIO wait control register PWCR 4700. If internal wait state generation is required, the wait state generator will begin to count the number of machine cycles according to the value stored in bits $W_{02}$, $W_{01}$ and $W_{00}$ (or $W_{12}$, $W_{11}$ and $W_{10}$ if BANK1 is accessed, or $W_{22}$, $W_{21}$ and $W_{20}$ if BANK2 is accessed) of the PIO wait control register PWCR 4700. Again, after the count by the wait state generator or receipt of the external release signal, the wait state generator 4702 will transmit the release signal PIWRL 4712 to the parallel arbiter 2100 (FIG. 1a) to signify that the external memory device 2500 requested is available for access.

Referring now to FIGS. 11, 11a and 11b, a fourth embodiment of the present invention is shown whereby DSP 1100 is coupled to a 128 k word by 24 bit EPROM module 4830 (BANK0) and four 32 k word by 24 bit SRAM modules 4832 (BANK1), 4834 (BANK2), 4836 (BANK3) and 4838

(BANK4). External memory devices 4830, 4832, 4834, 4836 and 4838 are specific examples of one particular type of 128 k word memory device and four particular types of 32 k word memory devices which are representative of the generic 128 k and 32 k devices BANK0 4300, BANK1 4302, BANK2 4304, BANK3 4306 and BANK4 4308 described previously. In this configuration, the PIO 4000 utilizes the mode information (SM1:SM0) stored in the PIO chip select register PCSR 4400 to determine which bank of memory, BANK0, BANK1, BANK2, BANK3 or BANK4, is to be accessed. In this configuration, bits (SM1:SM0) will be programmed to (1:1) corresponding to memory devices configuration SELECT MODE 11 in which the external memory is configured with one 128 k and four 32 k memory banks.

External address bus 4238 receives only 17 bits A16:A0 of the requested address from the PIO 4000 via the first output buffer 4236. According to this fourth embodiment, the chip select decoder 4202 will assert a logical low signal on the chip select line CS0 4412, CS1 4414, CS2 4416, CS3 4418 or CS4 4420 based on the decoded three most significant bits of the address being accessed, thereby enabling the correct bank of external memory. Simultaneously, the wait status controller 4200 determines if internal or external wait state generation is required by examining the $WS_0$, $WS_1$, $WS_2$, $WS_3$ or $WS_4$ bits of the PIO wait control register PWCR 4700. If internal wait state generation is required, the wait state generator will begin to count down the number of machine cycles according to the value stored in bits $W_{02}$, $W_{01}$ and $W_{00}$ (or $W_{12}$, $W_{11}$ and $W_{10}$ if BANK1 is accessed, or $W_{22}$, $W_{21}$ and $W_{20}$ if BANK2 is accessed etc.) of the PIO wait control register PWCR 4700. Again after the count by the wait state generator or receipt of the external release signal, the wait state generator 4702 will transmit the release signal PIWRL 4712 to the parallel arbiter 2100 (shown in FIG. 1a) to signify that the external memory device 2500 requested is available for access.

Referring now to FIG. 12, the bus arbitration controller 4206 of the present invention is shown. The bus arbitration controller 4206 allows the DSP 1100 to share external memory resources with other DSP's in a multi-DSP environment. For example, a DSP configured for two 128 k banks of external memory according to the preferred embodiment of the present invention may share one of the 128 k banks with another DSP. In this way, the 256 k of external memory available to be addressed by each DSP includes one local only 128 k bank of external memory and one shared 128 k bank of external memory which is addressable by both DSPs via shared address and data lines.

The bus arbitration controller 4206 includes access controller 4900 having a bus arbitration status word input BAWORD 4902, chip select control word input CSWORD 4706, external access enable signal PAEXTACC 4209 and three output ports BREQ 4906, BACK 4908 and BHLD 4910. The bus arbitration status word 4902 input comprises a 5 bit word (BA4:BA0) which reflects the status of the 5 most significant bits of the PIO chip select control register PCSR 4400 which are used to designate the existence of any shared memory banks to be utilized in a multi-DSP configuration. The chip select control word input CSWORD 4706 comprises a 5 bit word (CS4:CS0) which reflects the status of the five chip select signals (CS0 4412, CS1 4414, CS2 4416, CS3 4418 and CS4 4420). The external access enable signal PAEXTACC 4209 is generated by the parallel arbiter 2100 (shown in FIG. 1a) and indicates whether or not an external memory access is requested. The function of the BREQ, BACK and BHLD ports will be described below.

According to the preferred embodiment of the present invention, when an external memory request is made, the first three bits of the address of the memory location to be accessed are decoded by the chip select decoder 4202. The PIO interface 4000 then utilizes this information along with the mode information stored in the PIO chip select register PCSR 4400 to determine which bank of memory is to be accessed as described previously. The PIO next determines if the memory bank that has been selected is a shared memory bank in a multi-DSP environment by checking the particular bit (BA4:BA0) in the PIO chip select register PCSR 4400 associated with the selected memory bank. If the bus arbitration bit (BA4:BA0) is not set (a logical 0), then the external bus access will begin immediately (the chip select output port CS0–CS4 associated with the particular memory bank will be asserted low and the internal wait state generator 4702 begins its count or begins its wait for the external wait release signal from the external wait state generator).

Conversely, if the bus arbitration bit is set (a logical 1), a logical low level is asserted on the BREQ output port 4906. This low level output informs the external bus controller or arbiter 4950 that a user requests access to a portion of the shared memory. The PIO interface 4000 will hold off access to the external memory until it has received a logical low signal back from the external arbiter 4950 on the BACK port 4908. The external arbiter 4950 will hold the busses associated with the data, address, read/write and chip select for the exclusive use of the requesting DSP until the PIO interface 4000 transmits a hold release via the BHLD port 4910, at which time the external arbiter 4950 will release the external busses and allow other DSPs to access the shared memory.

Specifically, the access controller 4900 includes a PIO access hold control register PHLDR 4911, a first selector or decoder 4913, first AND gate 4915, second AND gate 4917 and third AND gate 4919, OR gate 4920, first inverter 4922 and second inverter 4924, first set-reset (S-R) flip-flop 4926 and second set-reset (S-R) flip flop 4928. The PIO access hold control register PHLDR 4904 is a one bit register for storing the status of a first BUS HOLD signal which is transmitted via the BHLD output port 4910 to an external arbiter 4950 in a multi-DSP configuration.

The BAWORD 4902 is coupled to the input of the first selector 4913 whose output 4914 is coupled to a first input of the first AND gate 4915, first input of the second AND gate 4917 and to the input of the first inverter 4922. The CSWORD signal 4706 is coupled to the first selector 4913 whereby the output 4914 of the first selector 4913 reflects the particular bit (BA4:BA0) associated with the bus arbitration status of the particular bank (BANK1–BANK-4) indicated by the CSWORD 4706. The external access enable signal PAEXTACC 4209 is coupled to the second input of the first AND gate 4915, whose output is in turn coupled to the set port of the first set-reset flip flop 4926. The Q output from the first set-reset flip flop 4926 is coupled to the BREQ output port 4906 of the bus arbitration controller 4206. As such, if the arbitration bit (BA4:BA0) selected by the first selector 4913 is set and an external access has been requested (as evidenced by the PAEXTACC signal 4209), then the set-reset flip flop 4926 will generate the BREQ signal and transmit it to the external arbiter 4950 via the BREQ port 4906.

Upon receiving the BREQ signal from the bus arbitration controller, the external arbiter will acknowledge when the external memory access may commence by means of a BACK signal. The bus arbitration controller 4206 receives the BACK signal via the BACK port 4908 and couples the BACK signal to the reset input of the first set-reset flip flop 4926 (thereby resetting the BREQ line in preparation for the next external memory request) and to the first input of the OR gate 4920. The output of the first inverter 4922 is coupled to the second input of the OR gate 4920, the output of which is in turn coupled to a first input of the third AND gate 4919. The external access enable enable PAEXTACC 4209 is coupled to the second input of the third AND gate 4919, whose output drives the counter enable 4711. As such, the counter enable signal 4711 will be set if an external access has been requested (as evidenced by PAEXTACC 4209 signal status) and either the external acknowledge (BACK) has been received from the external arbiter 4950 (indicative of a multi-DSP mode in which one of the arbitration bits (BA4:BA0) is set and therefore the output of the first OR gate 4920 will not go high until the BACK signal is received), or external the arbitration is not required for this bank (arbitration status bit (BA4:BA0) is low for the requested bank).

The second input to the second AND gate 4917 and the reset port of the second set-reset flip flop 4928 receive an input from the PIO access hold control register PHLDR 4911 indicative of the status of the single bit in the hold register. The output of the second AND gate 4917 is coupled to the set port of the second set-reset flip flop 4928, whose output is coupled to the BHLD port 4910 for transmission of the BUS HOLD signal to the external arbiter 4950. In the preferred embodiment of the present invention, the PIO access hold control register PHLDR 4911 is programmed via the PBUS 4401, and upon an external access request, is set high to indicate to the external arbiter 4950 that a DSP memory access is pending, and therefore the external arbiter 4950 should hold the external busses for the exclusive use of the requesting DSP.

Referring now to FIGS. 13, 13a, 13b, and 13c, a multi-DSP environment is shown including two DSP's incorporating a fifth embodiment of the present invention. The fifth embodiment incorporates the flexible memory architecture, decoding and wait state generation as described above while allowing the DSP to interface with an external controller for sharing a memory resource which heretofore was dedicated to a particular DSP. A first DSP 4970 is coupled to a first local memory 4972 and global memory 4974 by an external data bus 4266, external address bus 4238, chip select output CS0 bus 4412 and read/write enable signal bus 4220. A second DSP 4984 is coupled to a second local memory 4986 and the global memory 4974 by the same external data bus 4266, external address bus 4238, chip select output CS0 bus 4412 and read/write enable signal bus 4220. Local memory devices 4972 and 4986 are specific examples of two particular types of 128 k word memory devices which are representative of the generic 128 k devices BANK0 4300 described previously. Global memory 4974 is a specific example of a particular type of 128 k word memory device which is representative of the generic 128 k device BANK1 4302 described previously. Referring also to FIG. 6, both the first DSP 4970 and the second DSP 4976 are configured for two 128 k banks of external memory by programming the chip select mode (SM1:SM0) bits of the PIO chip select register 4400 to (0:1). Similarly, both DSPs are configured for shared external memory by setting the bus arbitration mode bit BA1 of the PIO chip select register 4400 to 1, thereby establishing BANK1(global memory 4974) as a shared memory resource and BANK0 as a local memory resource for each DSP.

Continuing to refer to FIGS. 13a, 13b, and 13c, according to the fifth embodiment of the present invention, DSP 4970 can access either the local memory 4972 as BANK1 or the global memory 4974 as BANK1. Similarly the second DSP 4984 may access its local memory 4986 as BANK1 or the global memory as BANK1. In order to access the external memory 2500, the DSP 4970 will decode the first three bits of the address of the requested memory location to be accessed by the chip select decoder 4202 as described previously. The PIO interface 4000 then utilizes this information along with the mode information stored in the PIO chip select register PCSR 4400 to determine which bank of memory is to be accessed as described previously. The PIO interface 4000 next determines if the memory bank that has been selected is a shared memory bank in a multi-DSP environment by checking the particular bit BA4:BA0 in the PIO chip select register PCSR 4400 associated with the selected memory bank.

If the decoded address requests a memory access from BANK0, the local memory resource 4972, then the DSP will immediately issue the address requested on the external address bus 4238 and begin the memory access as has been described above. If however the decoding indicates that the shared global memory resource 4974 is to be accessed, then a form of bus arbitration must occur in order to assure address and data integrity on the shared busses.

FIG. 13c shows an external arbiter 4950 for use with the present invention. External arbitration units are well known in the art. Utilized with the present invention, the external arbiter 4950 serves to control access to the shared memory device 4974 (global memory 4974) by 1) receiving the access request signal BREQ from any requesting DSP, 2) determining if the memory device is available for access by checking to see if any other DSP is presently accessing the shared memory 4974 (by checking the BUS HOLD signals from the other DSPs), 3) acknowledging the DSP that it is okay to begin the memory access by generating the BACK signal, 4) enabling the gated external address, data, read/write and chip select busses for use by the requesting DSP, and 5) holding the external busses until the requesting DSP released the BUS HOLD signal via the BHLD port 4910, and 6) disabling the busses when the memory access is complete (red/modify/write-back).

In the preferred embodiment, the shared bus environment requires a separate gating of the address and data busses, the read/write bus and chip select bus so as to isolate each DSP from inputs generated from the other. FIGS. 13a, 13b, and 13c show 8 gating devices 4988 and 8 enable/disable signal lines 4990 coupled from the gating devices to the external arbiter 4950 for controlling data flow through the devices. Bus gating devices are well known in the art, and as such are not described in detail in this disclosure.

In this example, since BA1 is set, a request to access BANK1 will result in a logical low level asserted on the BREQ output port 4906. Similarly, the single bit in the PIO access hold control register PHLDR 4911 will be set to a logical low level for transmission of the status of the PHLDR 4911 register via the first BUS HOLD signal at the BHLD output port 4910 to the external arbiter 4950. The low level output on the BREQ line informs the external arbiter 4950 that a user requests access to a portion of the shared memory 4974. The PIO interface 4000 will hold off access to the shared memory until it has received a logical low signal back from the external arbiter 4950 on the BACK port 4908. When it receives its low level signal, acknowledging the request to access the shared memory on the BACK port 4908, the PIO interface 4000 will begin its memory access.

Specifically, the DSP 4970 asserts the address of the memory location that is to be accessed onto the address bus 4238, enables the read/write port R/W 4220 and begins the wait state generation as has been described above. At the completion of the wait state, the data is made available on the data bus 4266 for writing or reading to the external shared memory device 4974. After the memory access is completed (including any write back that may be required), the BUS HOLD signal on BHLD output port 4910 of the first DSP 4970 is set low to inform the external arbiter 4950 that the memory access has been completed. In a similar fashion, the second DSP 4984 can access either BANK1 (the shared global memory 4974) or BANK0 (the local memory 4986).

While applicant has disclosed the application of the present invention in embodiments including a 24 bit Digital Signal Processor, the principles may be applied to other architectures without departing from the inventive spirit of present disclosure. Those normally skilled in the art will recognize that the principles disclosed will work equally well in [4904 a 32 bit, 64 bit or other similar architecture offering similar advantages in each.

What is claimed is:

1. A parallel interface for communicating on an external address bus and an external data bus with an external memory and for use in a digital signal processor having a plurality of separate internal data busses and internal address busses, said external memory having a particular memory configuration selected from among a plurality of memory configurations, said parallel interface comprising:

means for selectably routing an address from a specific address bus of said internal address busses onto said external address bus and routing data between a specific data bus of said internal data busses and said external data bus when access to said external memory is requested;

a chip select decoder having:
    a programmable chip select mode register for storing a mode configuration word that identifies said particular memory configuration from among said plurality of memory configurations; and
    a decoder circuit, responsive to both a plurality of bits of said address and said mode configuration word, for generating a chip select signal to enable a specific memory device of said external memory to be accessed with said address on said external address bus so as to receive or provide said data on said external data bus; and a wait status controller for generating an output wait release signal to indicate when said specific memory device is available for being accessed, said wait status controller having:
    a programmable wait state control register for storing a corresponding wait state packet for each memory device of said external memory, said wait state packet comprising a wait status indicator and a wait state count, said wait status indicator when set to a first predefined value indicating internal wait state generation and when set to a second predefined value indicating external wait state generation, said wait state count representative of a delay prior to allowing access to a corresponding memory device of said external memory;
    a first selector, responsive to said chip select signal from said decoder circuit, for selecting a wait state packet stored in said programable wait state control register corresponding to said specific memory device;
    a counter for generating a count of machine cycles of said digital signal processor when access to said external memory is requested;
    a comparator for comparing said wait state count of said selected wait state packet and said generated count and generating an internal wait release signal when said wait state count of said selected wait state packet and said generated count are equal;
    means, responsive to a ready signal generated by an external wait state generator indicating that said specific memory device is ready to be accessed, for generating an external wait release signal; and
    a second selector, responsive to said wait status indicator of said selected wait state packet, for selectably providing one of said internal wait release signal and said external wait release signal as said output wait release signal.

2. The parallel interface of claim 1 wherein said plurality of memory configurations includes a first configuration in which said external memory is a single memory device, and a second configuration, distinct from said first configuration, in which said external memory comprises a plurality of memory devices.

3. The parallel interface of claim 1 wherein:
  said programmable chip select mode register also stores an arbitration word that indicates that said specific memory device is shared;
  said parallel interface further comprises a bus arbitration controller for enabling said digital signal processor to share said specific memory device with at least a second digital signal processor;
  said bus arbitration controller having an access controller, responsive to said chip select signal and to said arbitration word, for transmitting a request signal to an external arbiter for accessing said specific memory device and, responsive to an acknowledge signal from said external arbiter indicating that said specific memory device is available to be accessed, for generating a counter enable signal to enable said counter to begin said provided count.

4. A method of interfacing with an external memory on an external address bus and an external data bus and for use in a digital signal processor having a plurality of separate internal data busses and internal address busses, said external memory having a particular memory configuration selected from among a plurality of memory configurations, said method comprising the steps of:

selectably routing an address from a specific address bus of said internal address busses onto said external address bus and routing data between a specific data bus of said internal data busses and said external data bus when access to said external memory is requested;

storing in a programmable chip select mode register of said digital signal processor a mode configuration word that identifies said particular memory configuration from among said plurality of memory configurations; and in response to both a plurality of bits of said address and said mode configuration word, generating a chip select signal to enable a specific memory device of said external memory to be accessed with said address on said external address bus so as to receive or provide said data on said external data bus; and generating an output wait release signal to indicate when said specific memory device is available for being accessed, said output wait release signal generating step including:
    storing in a programmable wait state control register of said digital signal processor a corresponding wait state packet for each memory device of said external memory, said packet comprising a wait status indicator and a wait state count, said wait status indicator when set to a first predefined value indicating internal wait state generation and when set to a second predefined value indicating external wait state generation, said wait state count representative of a delay prior to allowing access to a corresponding memory device of said external memory;
    in response to said chip select signal, selecting a wait state packet stored in said programmable wait state control register corresponding to said specific memory device;

generating a count of machine cycles of said digital signal processor when access to said external memory is requested;

comparing said wait count of said selected wait state packet and said generated count and generating an internal wait release signal when said wait state count of said selected wait state packet and said generated count are equal;

in response to a ready signal generated by an external wait state generator indicating that said specific memory device is ready to be accessed, generating an external wait release signal; and in response to said wait status indicator of said selected wait state packet, selectably providing one of said internal wait release signal and said external wait release signal as said output wait release signal.

5. The method of claim 4 wherein said plurality of memory configurations includes a first configuration in which said external memory is a single memory device, and a second configuration, distinct from said first configuration, in which said external memory comprises a plurality of memory devices.

6. The method of claim 4 further comprising the steps of:

storing in said programmable chip select mode register an arbitration word that indicates that said specific memory device is shared;

enabling said digital signal processor to share said specific memory device with at least a second digital signal processor, said enabling step including:

in response to said chip select signal and to said arbitration word, transmitting a request signal to an external arbiter for accessing said specific memory device; and in response to an acknowledge signal from said external arbiter indicating that said specific memory device is available to be accessed, generating a counter enable signal to enable said provided count to begin.

7. A digital signal processor comprising:

a plurality of separate internal data busses and internal address busses;

a parallel interface for communicating on an external address bus and an external data bus with an external memory, said external memory having a particular memory configuration selected from among a plurality of memory configurations, said parallel interface comprising:

means for selectably routing an address from a specific address bus of said internal address busses onto said external address bus and routing data between a specific data bus of said internal data busses and said external data bus when access to said external memory is requested;

a chip select decoder having:

a programmable chip select register for storing a mode configuration word that identifies said particular memory configuration from among said plurality of memory configurations; and a decoder circuit, responsive to both a plurality of bits of said address and said mode configuration word, for generating a chip select signal to enable a specific memory device of said external memory to be accessed with said address on said external address bus so as to receive or provide said data on said external data bus; and a wait state controller for generating an output wait release signal to indicate when said specific memory device is available for being accessed, said wait state controller having:

a programmable wait state control register for storing a wait state packet for each memory device of said external memory, said packet comprising a wait status indicator and a wait state count, said wait status indicator when set to a first predefined value indicating internal wait state generation and when set to a second predefined value indicating external wait state generation, said wait state count representative of a delay prior to allowing access to a corresponding memory device of said external memory;

a first selector, responsive to said chip select signal from said decoder circuit, for selecting a wait state packet stored in said programmable wait state control register corresponding to said specific memory device;

a counter for generating a count of machine cycles of said digital signal processor when access to said external memory is requested;

a comparator for comparing said wait state count of said selected wait state packet and said generated count and generating an internal wait release signal when said wait state count of said selected wait state packet and said generated count are equal;

means, responsive to a ready signal generated by an external wait state generator indicating that said specific memory device is ready to be accessed, for generating an external wait release signal; and a second selector, responsive to said wait status indicator of said selected wait state packet, for selectably providing one of said internal wait release signal and said external wait release signal as said output wait release signal.

8. The digital signal processor of claim 7 wherein said plurality of memory configurations includes a first configuration in which said external memory is a single memory device, and a second configuration, distinct from said first configuration, in which said external memory comprises a plurality of memory devices.

9. The digital signal processor of claim 7 wherein:

said programmable chip select register also stores an arbitration word that indicates that said specific memory device is shared;

said parallel interface further comprises a bus arbitration controller for enabling said digital signal processor to share said specific memory device with at least a second digital signal processor;

said bus arbitration controller having an access controller, responsive to said chip select signal and to said arbitration word, for transmitting a request signal to an external arbiter for accessing said specific memory device and, responsive to an acknowledge signal from said external arbiter indicating that said specific memory device is available to be accessed, for generating a counter enable signal to enable said counter to begin said provided count.

* * * * *